(12) United States Patent
Honkala et al.

(10) Patent No.: US 7,559,576 B1
(45) Date of Patent: Jul. 14, 2009

(54) VEHICLE WITH ADJUSTABLE STEERING

(75) Inventors: Bruce A. Honkala, Kaukauna, WI (US); Norman O. Berg, Roseau, MN (US); Jeffrey A. Eaton, Wannaska, MN (US); Greg A. Peppel, Wannaska, MN (US); Bruce J. Stone, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 709 days.

(21) Appl. No.: 10/903,464

(22) Filed: Jul. 30, 2004

Related U.S. Application Data

(60) Provisional application No. 60/585,996, filed on Jul. 7, 2004.

(51) Int. Cl.
*B62D 1/18* (2006.01)
(52) U.S. Cl. .................................................... 280/775
(58) Field of Classification Search ................ 280/771, 280/775, 778, 263, 267, 93.502, 93.507, 280/93.508, 93.513; 180/312
See application file for complete search history.

(56) References Cited

U.S. PATENT DOCUMENTS

| | | |
|---|---|---|
| 738,997 A | 9/1903 | Hayes et al. |
| 806,612 A | 12/1905 | Alden |
| 1,520,677 A | 12/1924 | Moyse |
| 2,185,779 A | 1/1940 | Tveidt |
| 2,226,656 A | 12/1940 | Best |
| 2,836,988 A | 6/1958 | Cashman |
| 3,028,766 A | 4/1962 | Musilli |
| 3,144,785 A | 8/1964 | Steiner et al. |
| 3,198,030 A | 8/1965 | Miller et al. |
| 3,395,930 A | 8/1968 | Morgan |
| 3,487,712 A | 1/1970 | Steiner |
| T0,875,019 I4 * | 6/1970 | Haddad et al. ................ 74/552 |
| 3,533,302 A | 10/1970 | Hansen |
| 3,561,282 A | 2/1971 | Hershman et al. |
| 3,678,778 A | 7/1972 | Groves |
| 3,700,257 A | 10/1972 | Hurlburt |
| 3,724,290 A | 4/1973 | Burton |
| 4,132,435 A | 1/1979 | Wilson |
| 4,244,236 A | 1/1981 | Sylvester |
| 4,307,626 A | 12/1981 | Sanada et al. |
| 4,351,406 A | 9/1982 | Lay |
| 4,363,499 A | 12/1982 | Watanabe et al. |
| 4,494,773 A | 1/1985 | Fukui |
| 4,495,834 A * | 1/1985 | Bauer et al. ................ 280/775 |
| 4,537,089 A | 8/1985 | Moneta |
| 4,540,189 A | 9/1985 | Tanaka |
| 4,660,673 A | 4/1987 | Yoshii |
| 4,688,817 A | 8/1987 | Marier |
| 4,726,311 A | 2/1988 | Niina |
| 4,896,559 A | 1/1990 | Marier et al. |
| 4,896,899 A | 1/1990 | Lawrence |
| 4,941,766 A | 7/1990 | Carlson |
| 5,009,120 A * | 4/1991 | Iseler et al. ................... 74/493 |
| 5,054,798 A | 10/1991 | Zulawski |
| 5,088,342 A | 2/1992 | Bening et al. |

(Continued)

*Primary Examiner*—John Q. Nguyen
*Assistant Examiner*—Robert A. Coker
(74) *Attorney, Agent, or Firm*—Baker & Daniels LLP

(57) ABSTRACT

A straddle seat type vehicle with adjustable steering. The vehicle comprises a handlebar adjustment apparatus functionally formed on a chassis that fixes the pivot of a steering post in angular positions about a pivot mechanism. A method of adjusting a steering control position is also included.

52 Claims, 22 Drawing Sheets

U.S. PATENT DOCUMENTS

| | | |
|---|---|---|
| 5,168,768 A | 12/1992 | Easton |
| 5,944,133 A * | 8/1999 | Eto .......................... 180/190 |
| 6,055,922 A | 5/2000 | Madachi et al. |
| 6,116,646 A | 9/2000 | Plas et al. |
| 6,189,405 B1 * | 2/2001 | Yazane ....................... 74/493 |
| 6,202,584 B1 | 3/2001 | Madachi et al. |
| 6,276,291 B1 | 8/2001 | Lapointe et al. |
| 6,446,744 B2 | 9/2002 | Wubbolts et al. |
| 6,450,531 B1 * | 9/2002 | Rinker et al. ................ 280/775 |
| 6,929,278 B2 * | 8/2005 | Vaïsanen .................... 280/279 |
| 2001/0047900 A1 | 12/2001 | Fecteau et al. |
| 2002/0007774 A1 | 1/2002 | Madachi et al. |
| 2003/0188596 A1 | 10/2003 | Vaisanen |
| 2004/0035626 A1 * | 2/2004 | Girouard et al. ........... 180/210 |
| 2005/0115754 A1 | 6/2005 | Watson et al. |
| 2005/0194199 A1 | 9/2005 | Marks et al. |

* cited by examiner

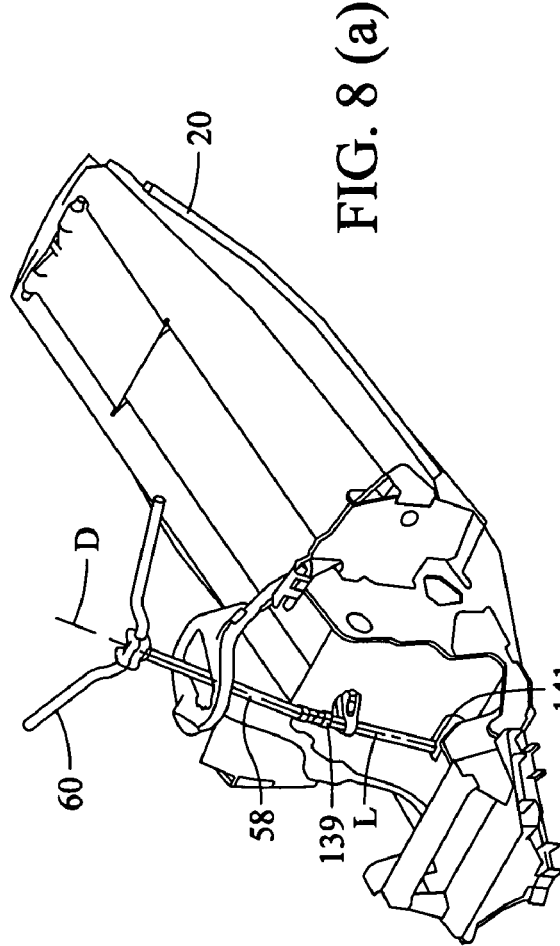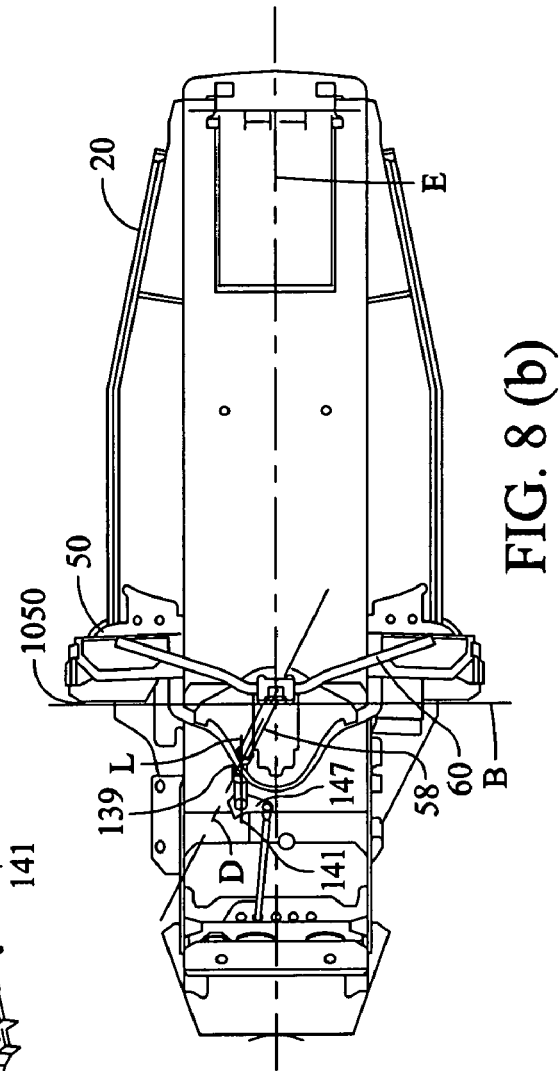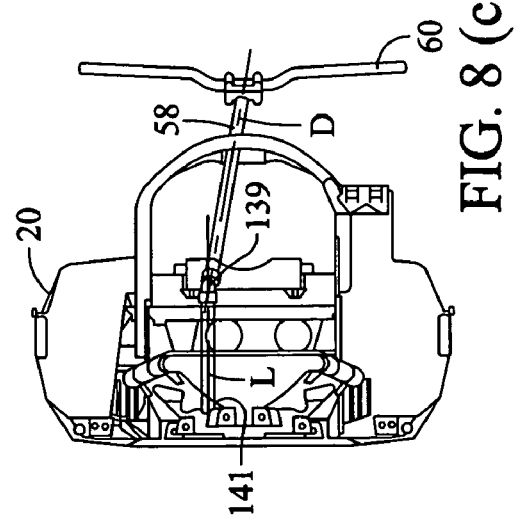

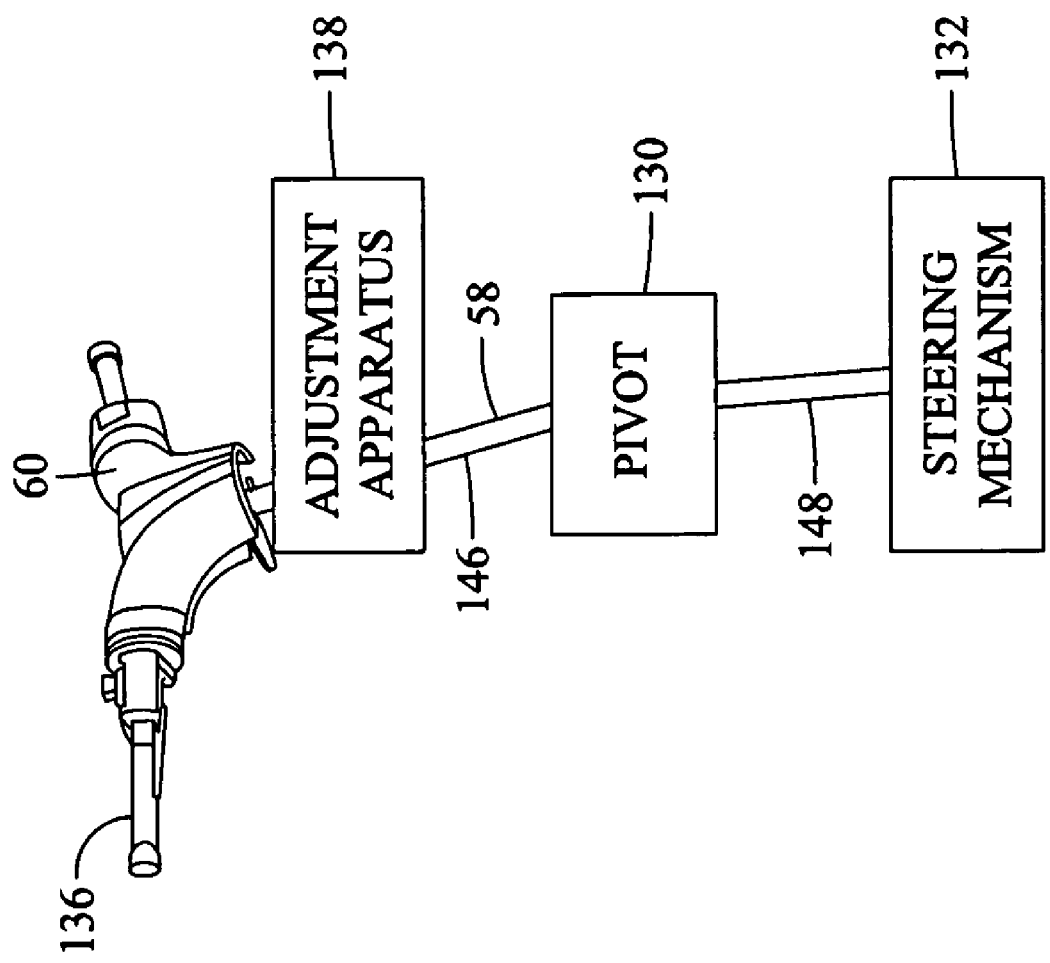

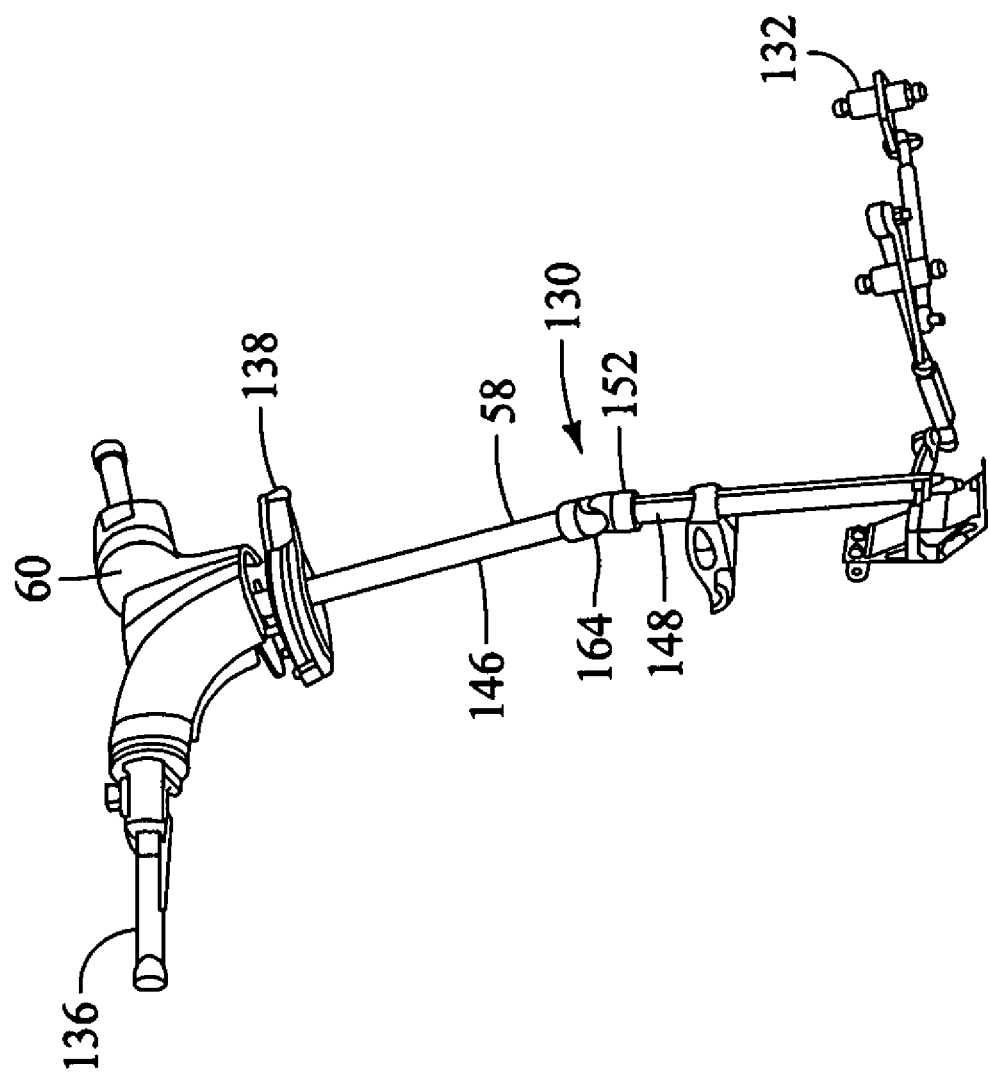

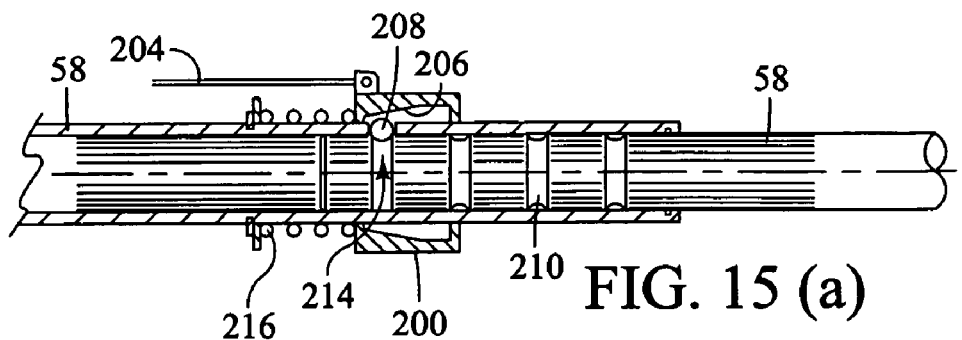
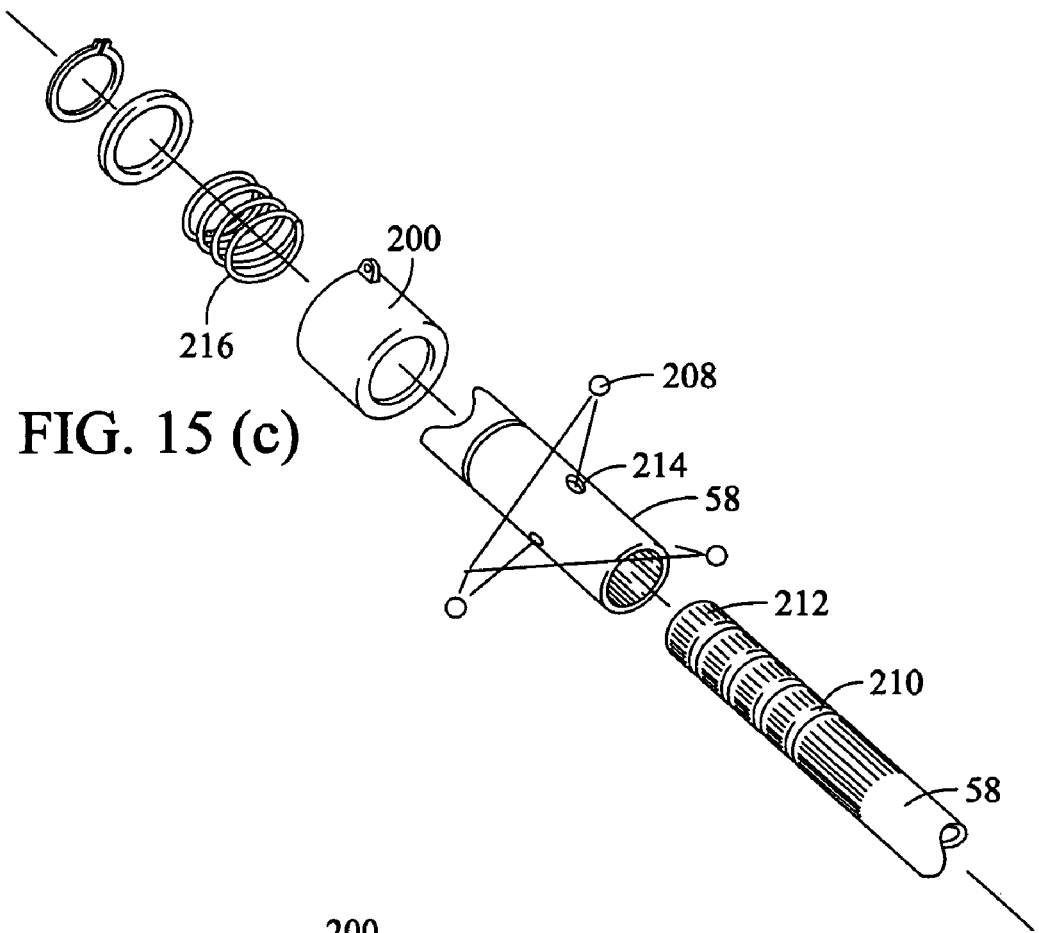
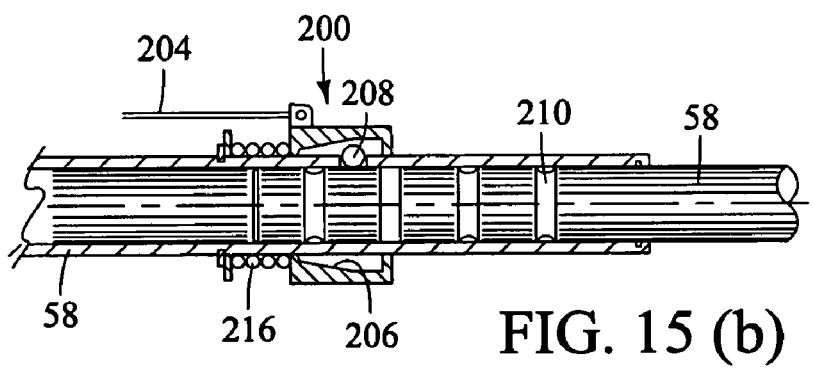

VEHICLE WITH ADJUSTABLE STEERING

RELATED APPLICATION

This application claims priority to provisional U.S. Application Ser. No. 60/585,996, filed Jul. 7, 2004, the entire disclosure of which is hereby incorporated by reference.

FIELD

This disclosure relates to vehicles provided with an adjustable steering apparatus.

BACKGROUND

Ergonomics are important for recreational and utility vehicles. Often, a single rider may wish to ride in a variety of styles. Further, a single vehicle may be operated by several different riders over the course of its useful life. These riders are frequently of different heights and sizes. For example, a single vehicle may be operated by both a generally smaller female adolescent and a generally larger male adult. From an ergonomic standpoint, the position of steering members, such as the handlebars and steering post, relative to the rider are important. Handlebars that are too close or too distant, or at an inappropriate height, may provide an inadequate fit for a rider or may render the vehicle unsuitable for a particular riding style.

SUMMARY

The disclosure relates to a vehicle with adjustable steering. In some embodiments, the vehicle comprises a straddle seat type vehicle, such as a snowmobile, all terrain vehicle, or personal watercraft. In certain embodiments, the vehicle can be provided with a handlebar adjustment apparatus functionally formed on a chassis that fixes the pivot of a steering post in angular positions about a pivot mechanism. Certain embodiments also include a method of adjusting a steering control position.

In some embodiments, the vehicle includes a chassis, an engine, a seat, and at least one ground engaging element such as a wheel or a ski for steering the vehicle. The vehicle in these embodiments includes a steering post operatively connected to the ground-engaging element and having a pivot mechanism such as a joint that permits the portion of the steering post above the pivot mechanism to pivot longitudinally fore and aft. The vehicle may also include a steering control such as handlebars for rotating the steering post and an adjustable steering mechanism. The adjustable steering mechanism movably couples the steering post to the chassis and includes a lock that locks the steering post to the chassis or a means for locking the steering post to the chassis. The adjustable steering mechanism may also include a mechanism for releasing the lock, a steering post retainer, and a guide track functionally formed on the chassis. The adjustable steering mechanism selectively permits movement of the steering post retainer along the guide track to move the steering control longitudinally fore and aft.

In some embodiments, the vehicle is a snowmobile with adjustable steering having a chassis, an engine, a straddle type seat and at least one ski. A steering post may connect to at least one ski and have a pivot mechanism permitting the portion of the steering post above the pivot to pivot longitudinally fore and aft. Handlebars may be supported by the steering post and move longitudinally with the pivot of the steering post about the pivot mechanism along an arc with a radius of at least equal of the extent of adjustability of the steering post. The snowmobile may also include a handlebar adjustment apparatus connected to the chassis and fixing the pivot of the steering post in angular positions about the pivot in a range of about 0 to 45 degrees from vertical, where adjustment moves the handlebars more longitudinally than vertically.

BRIEF DESCRIPTION OF THE DRAWINGS

FIG. 8(a) shows a perspective view of a snowmobile chassis and steering assembly in accordance with an embodiment of the present invention.

FIG. 8(b) shows a top plan view of a snowmobile chassis and steering assembly in accordance with an embodiment of the present invention.

FIG. 8(c) shows a front plan view of a snowmobile chassis and steering assembly in accordance with an embodiment of the present invention.

FIG. 9 shows a schematic view of a steering adjustment apparatus in accordance with an embodiment of the present invention.

FIG. 10 shows s perspective view of a steering adjustment apparatus in accordance with an embodiment of the present invention.

FIG. 15(a) shows a partially cutaway view of a telescoping steering adjustment apparatus in accordance with an embodiment of the present invention.

FIG. 15(b) shows a partially cutaway view of the telescoping steering adjustment apparatus of FIG. 15(a) with the telescope lock in the released position.

FIG. 15(c) shows an exploded view of the telescoping steering adjustment apparatus of FIG. 15(a).

DETAILED DESCRIPTION

Figure 1:
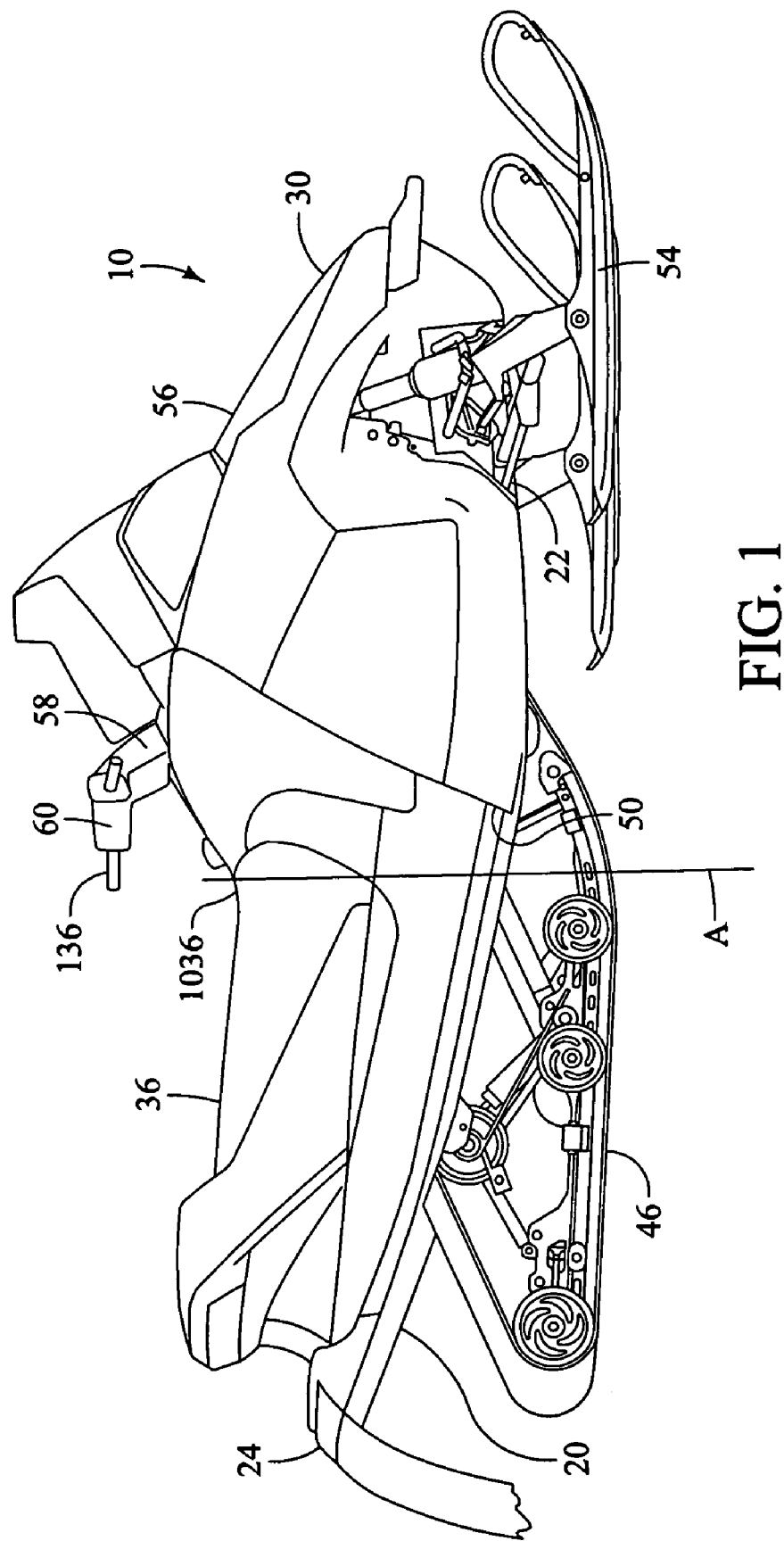
FIG. 1 shows a side plan view of a snowmobile in accordance with an embodiment of the present invention.

The following detailed description should be read with reference to the drawings, in which like elements in different drawings are numbered identically. The drawings, which are not necessarily drawn to scale, depict selected embodiments and are not intended to limit the scope of the embodiments. Several forms of the embodiments will be shown and described, and other forms will be apparent to those skilled in the art. It will be understood that embodiments shown in drawings and described are merely for illustrative purposes and are not intended to limit the scope of the embodiments as defined in the claims that follow.

A snowmobile 10 in accordance with an embodiment of the present invention is shown in FIGS. 1, 4-7, 11 and 12. Generally, snowmobile 10 includes a longitudinally extending chassis 20 having a front portion 22 and a rear portion 24. The chassis 20 supports and mounts several vehicle components, including an engine 30, a seat 36, a drive track 46, at least one ground engaging element, such as a pair of steerable skis 54, and a body assembly 56. In some embodiments, the chassis 20 supports the engine 30 proximate the front portion 22 and the seat 36 proximate the rear portion 24. The seat 36 is adapted to accommodate a rider 40 in straddle fashion, and the engine 30 powers the drive track 46 operatively connected to the chassis 20 proximate the rear portion 24. Means for supporting a rider's feet extending longitudinally below opposite lateral sides of the seat 36 may be provided. In some embodiments, the means may include footrests 50 that extend longitudinally below opposite lateral sides of the seat 36. The chassis front portion 22 may be suitable for mounting the pair of steerable skis 54 and supporting the body assembly 56. The body assembly 56 may contain the engine 30. A steering post 58 is operatively connected to the pair of skis 54. Means for rotating the steering post 58 to effect steering may be provided, and the means for rotating may be supported by the steering post 58. In some embodiments, the means for rotating may include a steering control, such as handlebars 60, supported by the steering post 58.

Figure 2:
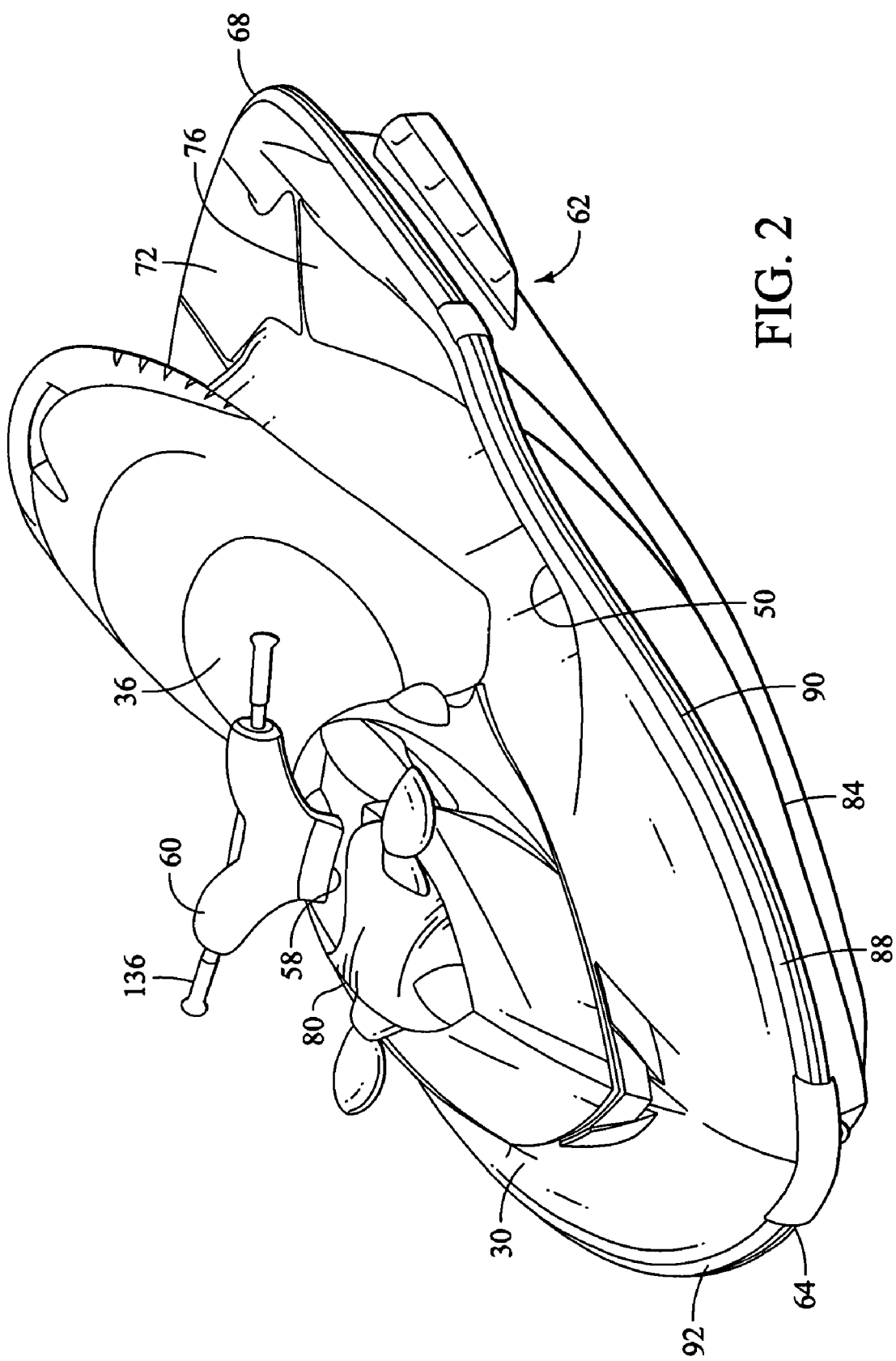
FIG. 2 shows a perspective view of a personal watercraft in accordance with an embodiment of the present invention.

A watercraft 62 in accordance with an embodiment of the present invention is shown in FIG. 2. Watercraft 62 has generally a front or bow 64 and a rear or stem 68 and includes an upper portion 72 that includes a top deck 76 and shroud 80. The top deck 76 is secured to a bottom hull 84 along an overlapping portion 88 covered with a rub rail 90, thereby forming a hull 92. The hull 92 can serve as a chassis 20' for mounting and supporting other watercraft vehicle components. The hull 92 formed by the bottom hull 84 and top deck 76 defines a compartment sized to house an internal combustion engine 30' for powering the watercraft 62. The deck 76 also has a raised, longitudinally extending seat 36' adapted to accommodate one or more riders 40' seated in straddle fashion. A footrest 50' area is also provided. A steering post 58' is operatively connected to a jet useful for providing steering to the watercraft 62. In this example, the jet may be considered an at least one ground engaging element. Handlebars 60' supported by the steering post 58' may be provided for rotating the steering post 58 to effect steering.

Figure 3:
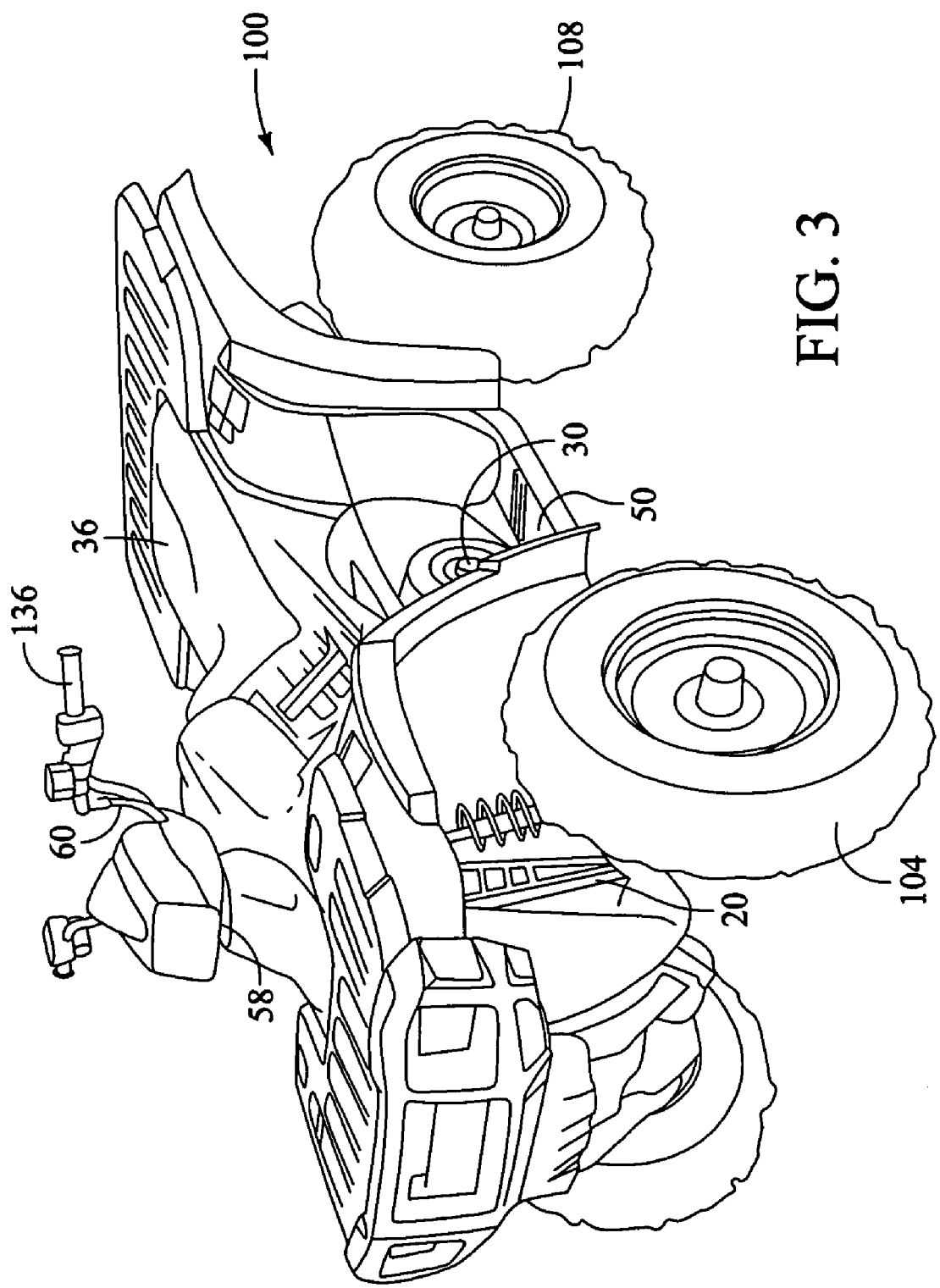
FIG. 3 shows a perspective view of an all terrain vehicle in accordance with an embodiment of the present invention.

An ATV 100 in accordance with an embodiment of the present invention is shown in FIG. 3. ATV 100 includes a chassis 20", at least one ground engaging element, such as two front wheels 104 and two rear wheels 108, a straddle-type seat 36", laterally extending footrests 50" on opposite sides of the vehicle, and an engine 30" located generally beneath the straddle-type seat 36" and substantially between the footrests 50". A steering post 58" is operatively connected to the pair of wheels. Handlebars 60" supported by the steering post 58" may be provided for rotating the steering post 58" to effect steering.

Similar components on each vehicle are identified above with like names and element numbers. Distinctions between such components are indicated above with the use and non-use of a prime or double-prime after the element number. In order to simplify the discussion hereinafter, no prime or double-prime indicators are used. It is understood, however, that all references to elements defined in multiple vehicle types (e.g., chassis 20, engine 30, seat 36, footrest 50, steering post 58, handlebars 60, etc.) may apply to each of such vehicles. Although the following discussion is largely directed to snowmobiles in the interest of simplifying the discussion, it is understood that the discussion may apply equally to other straddle seat type vehicles.

Each of the vehicles described above may include means for pivoting the steering post 58. In some embodiments the means for pivoting the steering post 58 includes a pivot mechanism 130.

In some embodiments, such as that shown in FIG. 10, the pivot mechanism 130 permits the portion of the steering post 58 above it to pivot. Below the pivot 130, the steering post 58 may be operatively connected to a steering mechanism 132 in any suitable manner, as will be appreciated by those reasonably skilled in the art. As discussed further below, a bottom portion of the steering post 58 may be mounted below the pivot 130 and connect to the steering mechanism 132. Alternatively, the bottom of the pivot mechanism 130 may connect directly to the steering mechanism 132 without the use of a bottom steering post. In yet another alternate embodiment, the pivot 130 may be positioned on the steering post 58 below the connection to the steering mechanism 132. The connection to the steering mechanism would, in such a design, have to adjust with the pivot of the steering post 58 above the pivot 130. In yet other embodiments, the steering post 58 may include several sections and/or pivot mechanisms 130.

A steering control, such as handlebars 60, supported by the steering post 58 may move longitudinally with the pivot of the steering post 58. Hand grip means, such as hand grips 136, may be mounted on opposite sides of the handlebars 60 adapted to be gripped by the hands of a rider 40, and a handlebar location may be defined as the centerpoint between the hand grips 136 when the handlebars 60 are orientated in a position to steer the vehicle in a substantially straight direction. In the embodiment shown in FIG. 7, the handlebar location is centerpoint A.

Figure 4:
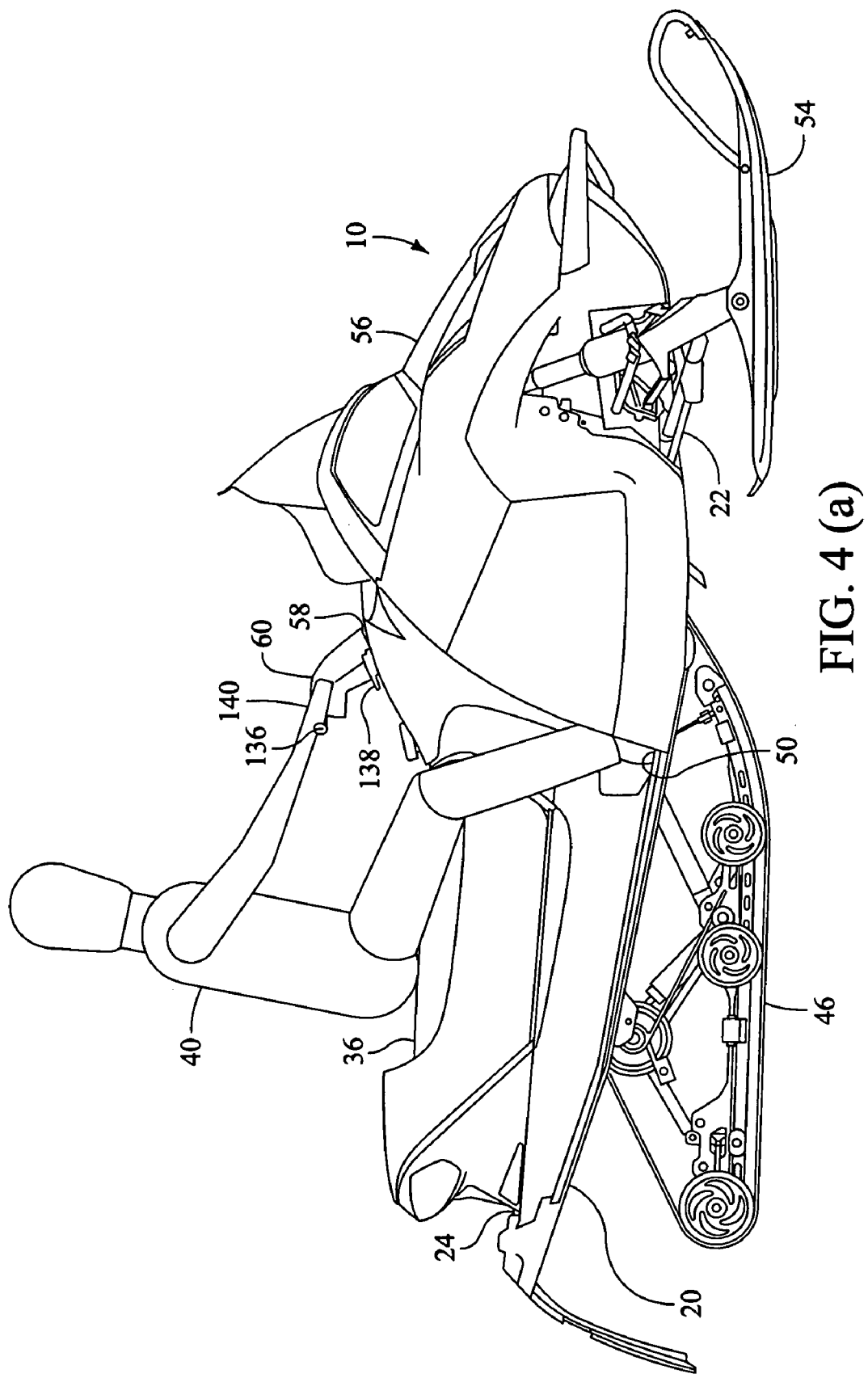
FIG. 4(a) shows a side plan view of a snowmobile with a rider in a first cruising position in accordance with an embodiment of the present invention.
FIG. 4(b) shows a side plan view of a snowmobile with handlebars in a first position in accordance with an embodiment of the present invention.
Figure 4:
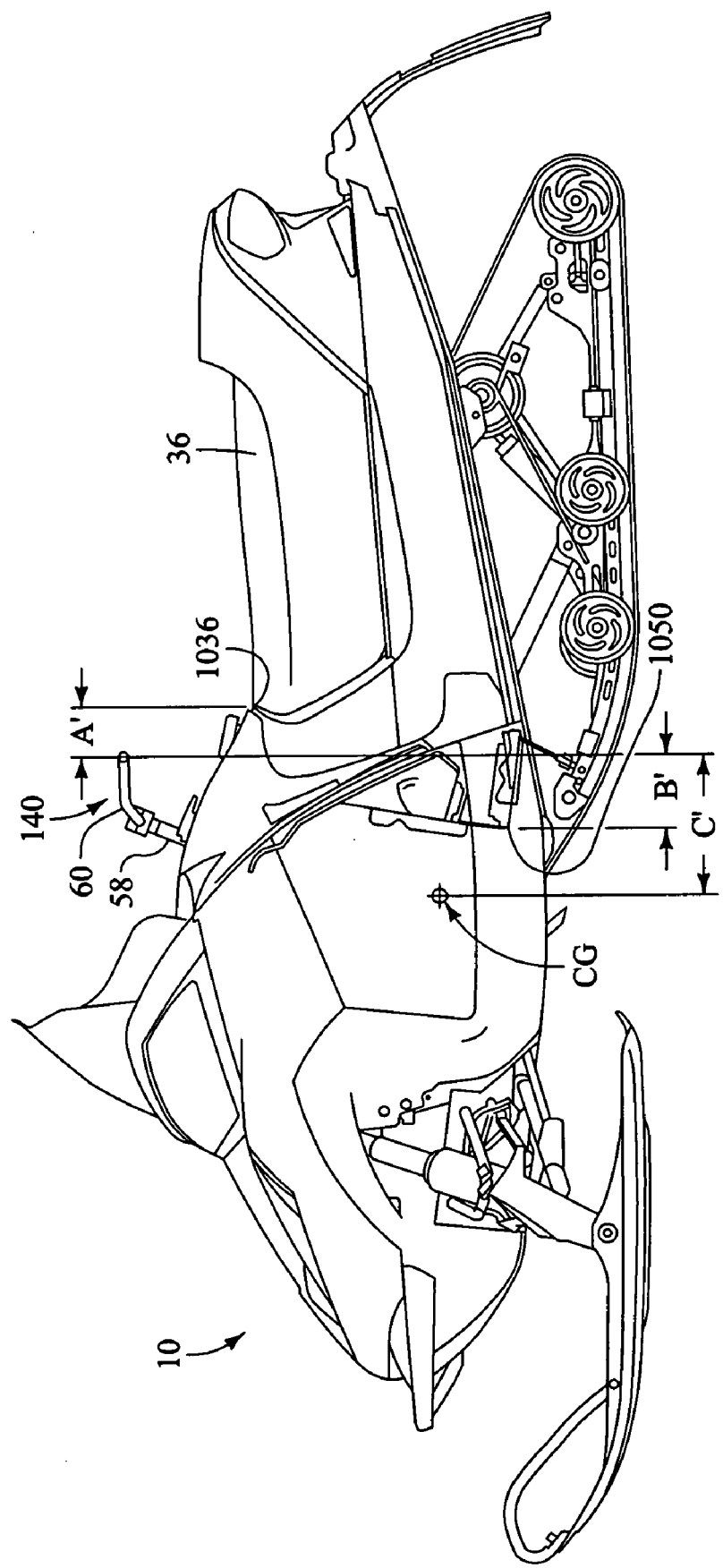
Figure 5:
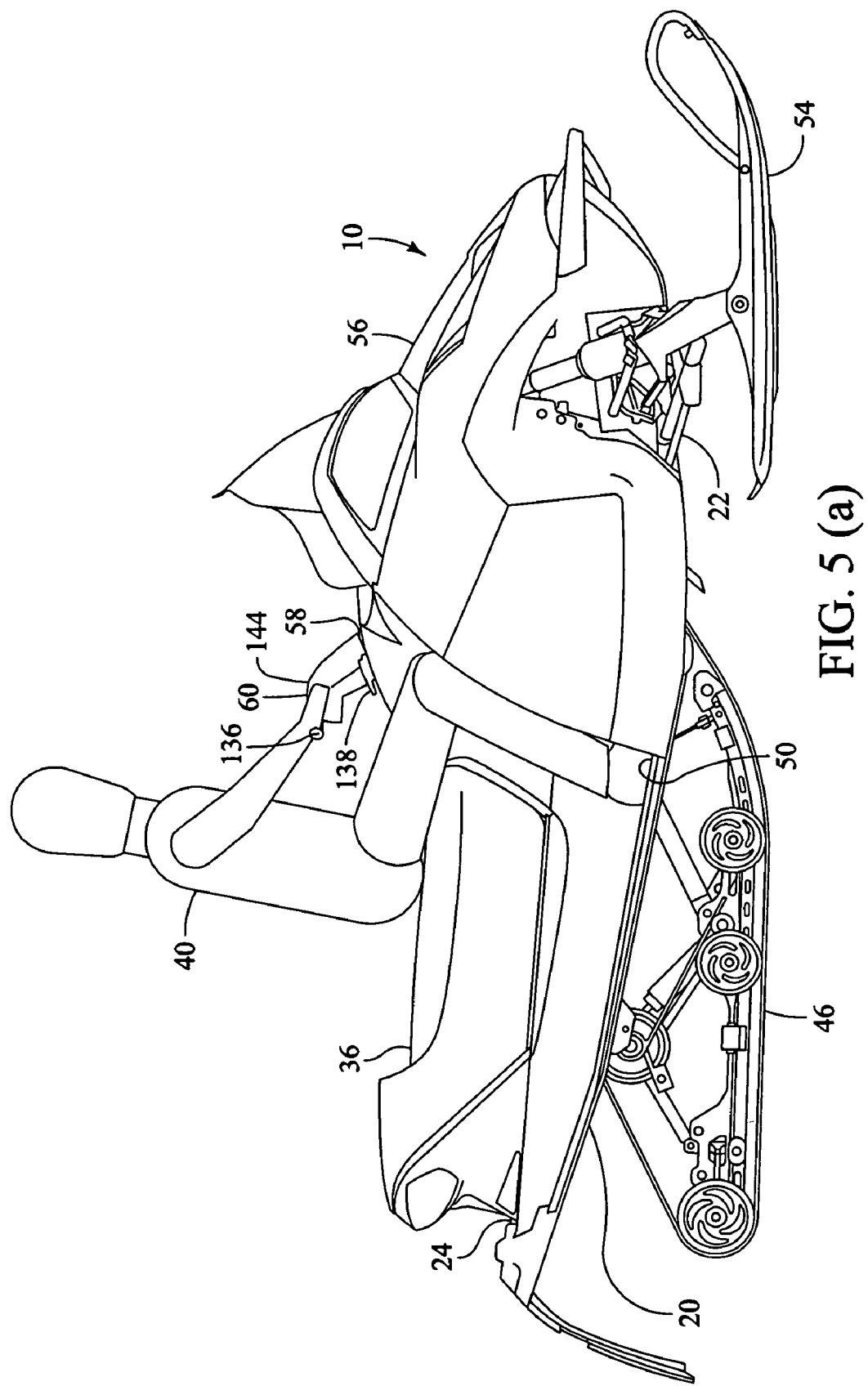
FIG. 5(a) shows a side plan view of a snowmobile with a rider in a second aggressive position in accordance with an embodiment of the present invention.
FIG. 5(b) shows a side plan view of a snowmobile with handlebars in a second position in accordance with an embodiment of the present invention.
Figure 5:
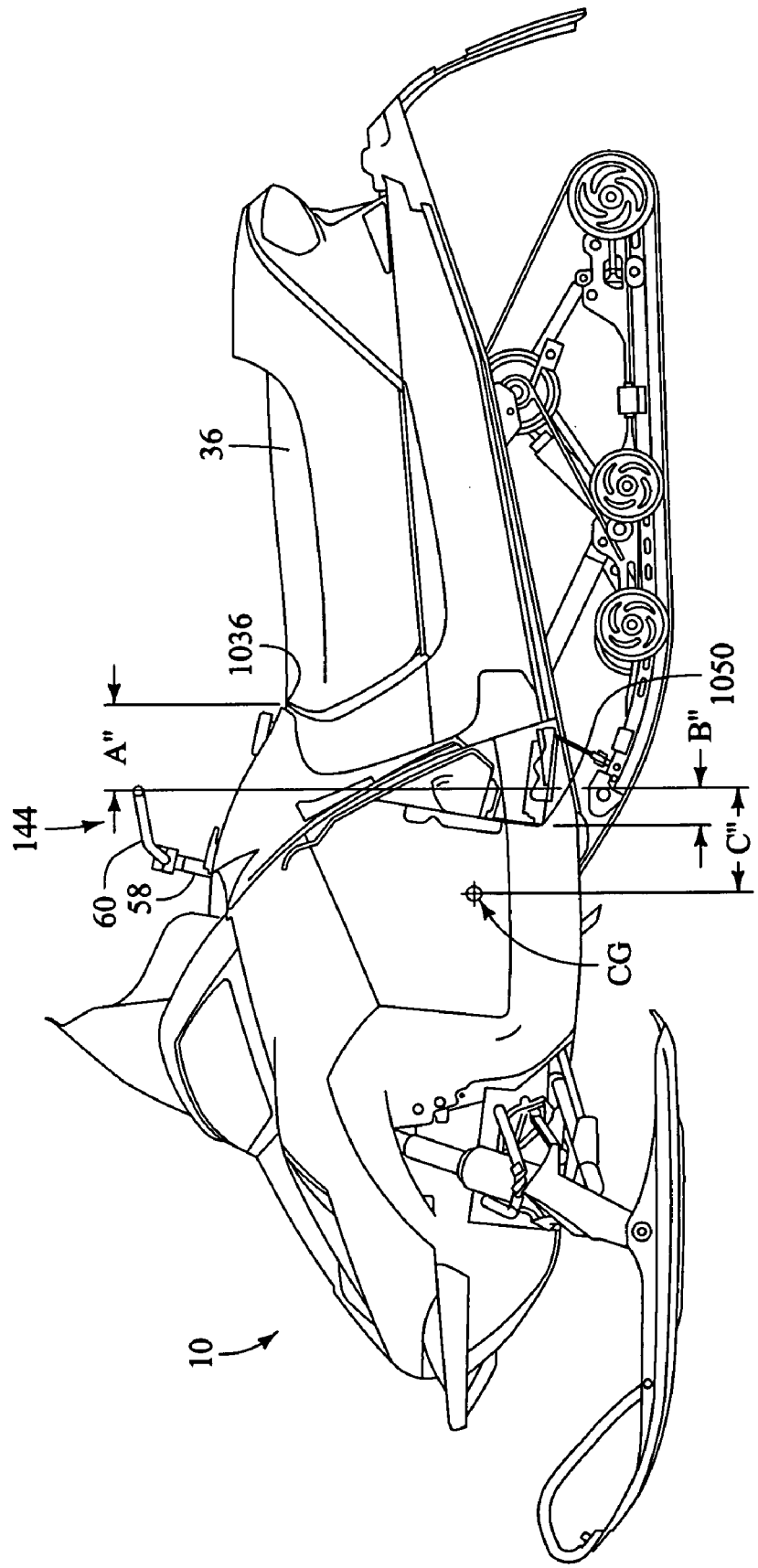
Figure 6:
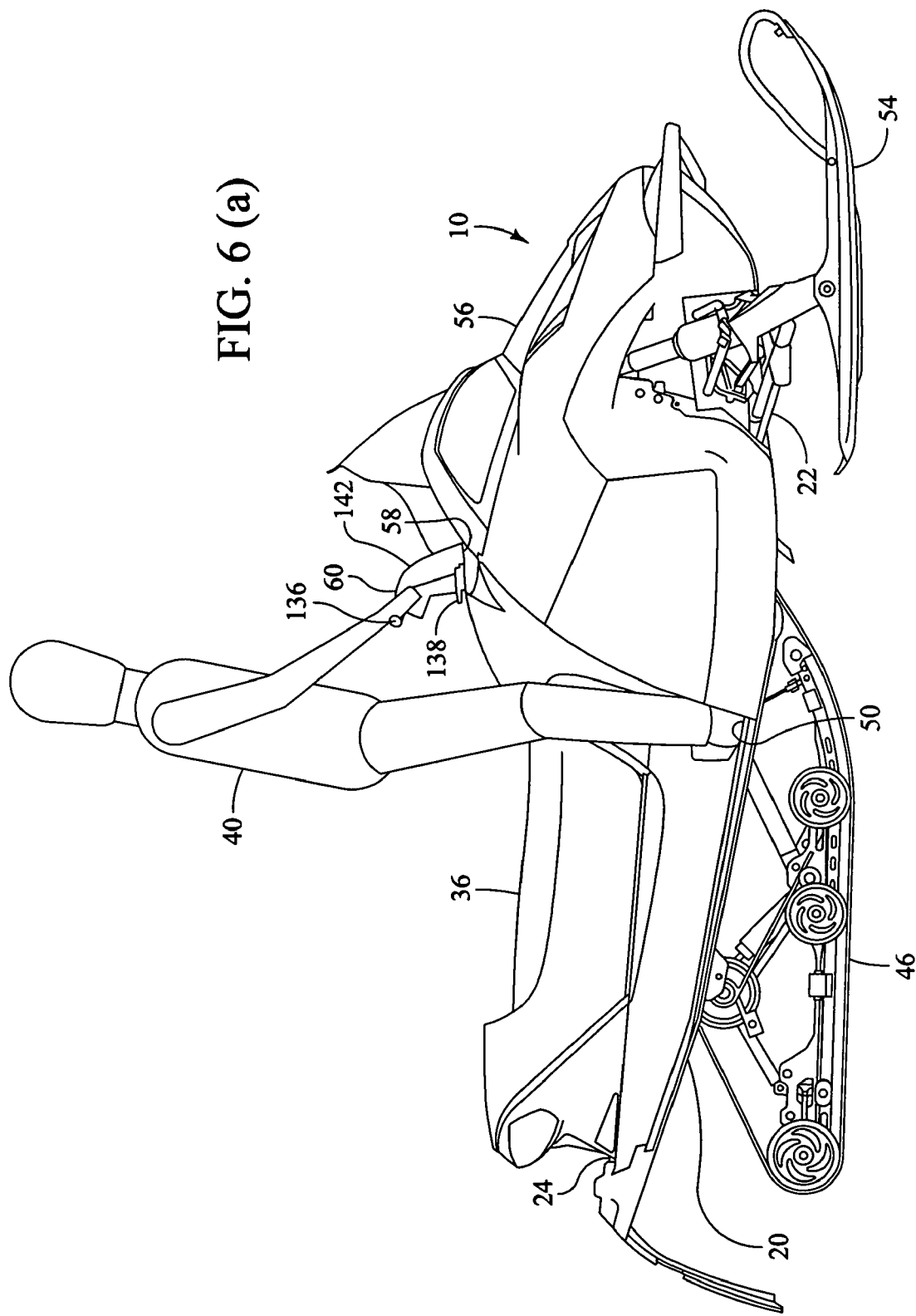
FIG. 6(a) shows a side plan view of a snowmobile with a rider in a third standing position in accordance with an embodiment of the present invention.
FIG. 6(b) shows a side plan view of a snowmobile with handlebars in a third position in accordance with an embodiment of the present invention.
Figure 6:
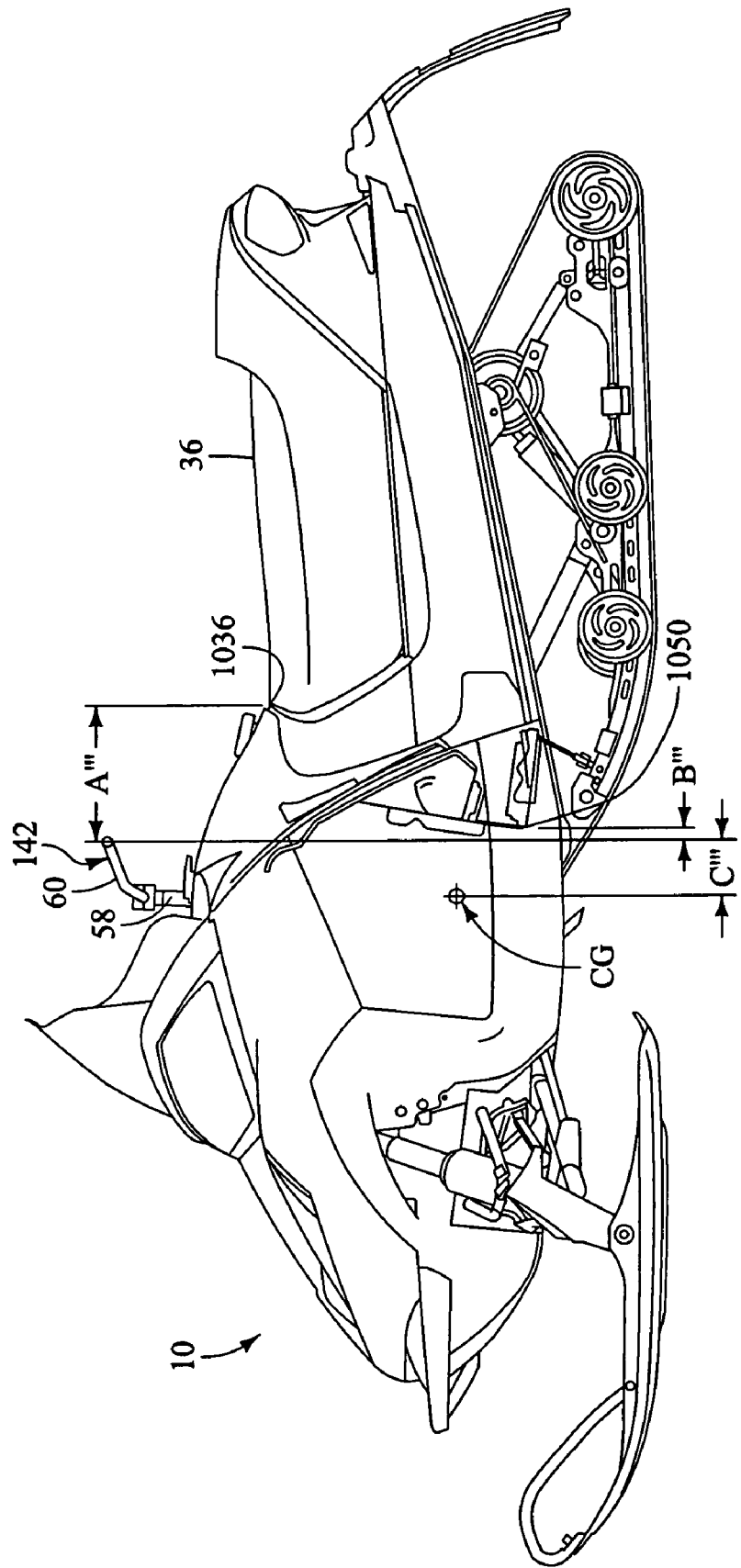
Figure 7:
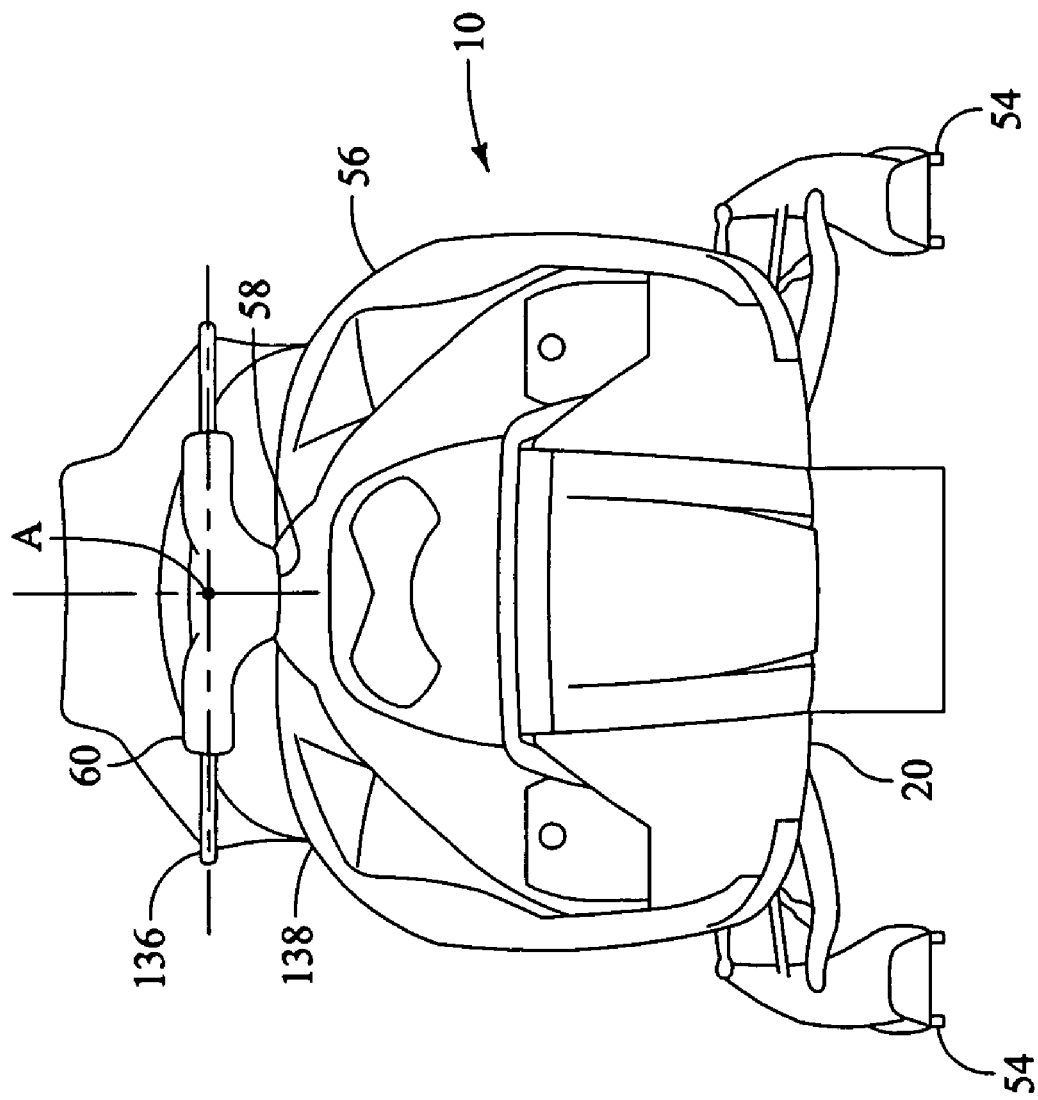
FIG. 7 shows a rear plan view of a snowmobile in accordance with an embodiment of the present invention.
Figure 11:
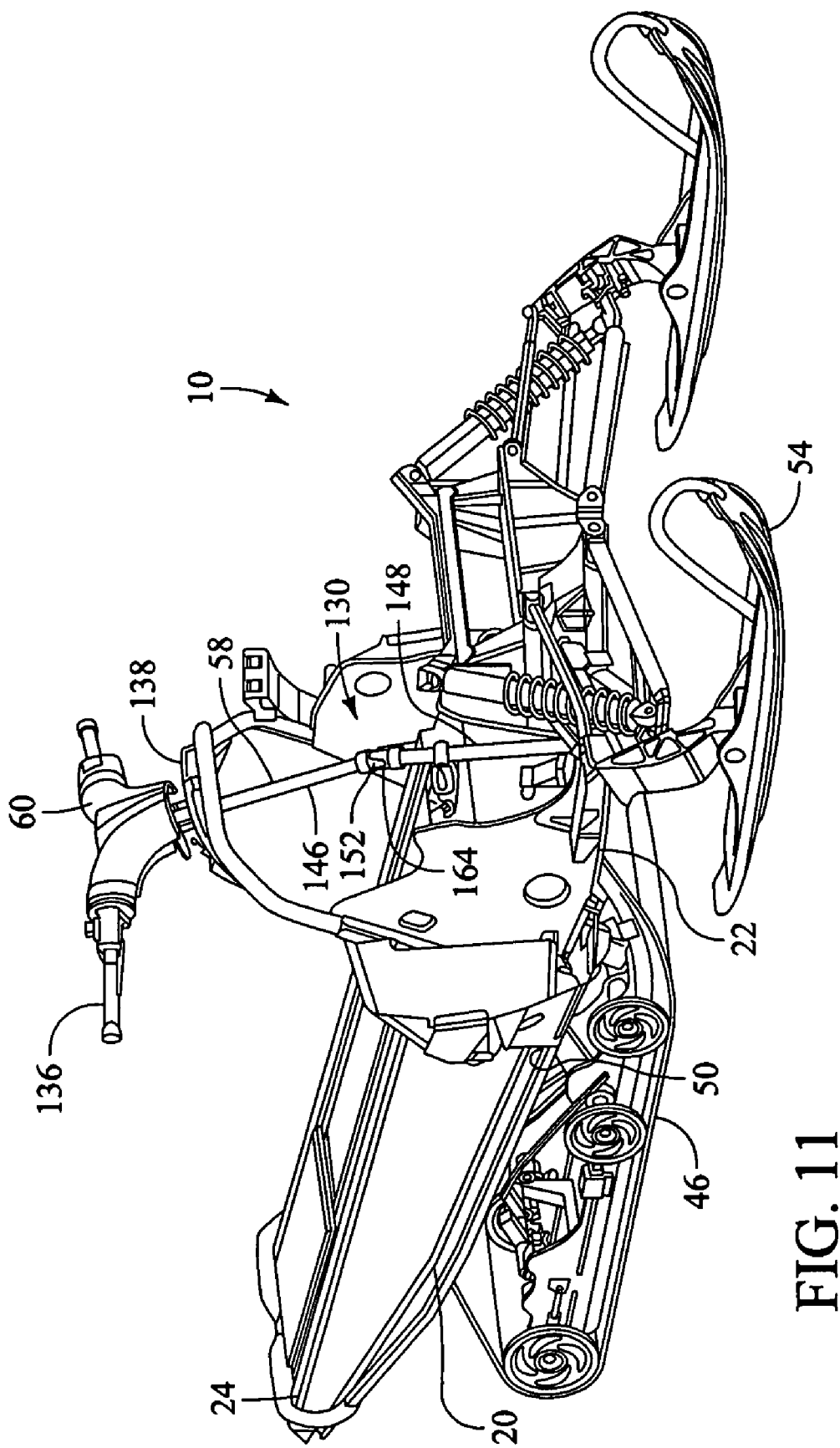
FIG. 11 shows a perspective view of a snowmobile chassis and steering assembly in accordance with an embodiment of the present invention.

Means for adjusting the steering post, such as a handlebar adjustment apparatus 138, may be connected to the chassis 20 to fix the pivot of the steering post 58 in angular positions about the pivot mechanism 130. In some embodiments, the angular positions of the steering post 58 provides at least longitudinally forward, intermediate, and/or rearward handlebar positions. The rearward handlebar position 140 may be adapted to accommodate a rider comfort configuration positioning the rider 40 relatively rearward on the snowmobile seat 36 as shown in FIG. 4(*a*). Such a position is useful for proving the rider 40 with cruising style ergonomics. The forward handlebar position 142 may be adapted to accommodate a rider standing position positioning the rider 40 relatively forward on the snowmobile 10 in a standing position as shown in FIG. 6(*a*). Such a position is useful for providing a rider 40 with racing style ergonomics. The intermediate handlebar position 144 may be adapted to accommodate a rider control position positioning the rider 40 at a forward position on the snowmobile seat 36 as shown in FIG. 5(*a*). Such a position is useful for providing a rider 40 with aggressive style ergonomics. In some embodiments, the longitudinally forward, intermediate, and rearward handlebar 60 locations provide the corresponding rider position.

Of course, the rider 40 is not required to ride the snowmobile 10 in the style corresponding to the longitudinally forward, intermediate, and rearward positions. For example, the rider 40 may wish to remain seated on the seat 36 while the handlebars 60 are in the longitudinally forward position 142. Further, handlebar adjustment apparatus 138 may provide for additional positions suitable for different riding styles, different rider sizes, and/or multiple positions suitable for a single riding style. Generally, adapted to accommodate means a typical rider may be more comfortable in a certain riding position when the handlebars 60 are in a given location. In some embodiments, the rider may be able to ride the snowmobile 10 in several positions corresponding to several riding styles without having to change foot location to remain in an ergonomically appropriate position.

As discussed above, some embodiments of the invention include a rearward handlebar position 140 as shown in FIGS. 4(*a*) and (*b*). In some embodiments, the rearward handlebar position 140 is less than about the longitudinal distance A' longitudinally forward of a front end 1036 of the seat 36, as shown in FIG. 4(*b*). The front end 1036 of the seat 36 may be seen as the forward-most padded portion on the top of the seat, such as that shown at line A in FIG. 1. In some embodiments, the longitudinal distance A' is less than about five inches. In other embodiments, the longitudinal distance A' is less than about three inches. In yet other embodiments the rearward handle bar position 140 is behind the front end 1036 of the seat 36.

In other embodiments, the longitudinal positions for the handlebar location includes a rearward handlebar position 140 at least about the longitudinal distance B' longitudinally rearward of a front end 1050 of the footrests 50, as shown in FIG. 4(*b*). The front end 1050 of the footrests may be seen as where the footrest 50 angles upward from its generally horizontal extent, as shown by line B in FIG. 8(*b*). In some embodiments the longitudinal distance B' is at least about four inches. In other embodiments the longitudinal distance B' is at least about six inches. In yet other embodiments the longitudinal distance B' is at least about eight inches.

In other embodiments, the longitudinal positions for the handlebar location includes a rearward handlebar position 140 at least about the longitudinal distance C' longitudinally rearward of a vehicle center of gravity location CG, as shown in FIG. 4(*b*). In some embodiments the longitudinal distance C' is at least about ten inches. In other embodiments, the longitudinal distance C' is at least about twelve inches. In yet other embodiments, the longitudinal distance C' is at least about fourteen inches. Of course, the same embodiment may include a handlebar location that includes a rearward handlebar position 140 less than about the longitudinal distance A' longitudinally forward of a front end of the seat 36, at least about the longitudinal distance B' longitudinally rearward of a front end of the footrests 50, and/or at least about the longitudinal distance C' longitudinally rearward of a vehicle center of gravity location.

Some embodiments include an intermediate handlebar position 144, as shown in FIGS. 5(*a*) and (*b*). For example, intermediate handlebar position 144 may be about the longitudinal distance A" longitudinally forward of a front end 1036 of the seat 36, as shown in FIG. 5(*b*). In some embodiments, the longitudinal distance A" is between about five inches and nine inches. In other embodiments, the longitudinal distance A" is between about six inches and eight inches.

In other embodiments the longitudinal positions for the handlebar location includes an intermediate handlebar position 144 that may be about the longitudinal distance B" longitudinally rearward of a front end 1050 of the footrests 50, as shown in FIG. 5(*b*). In some embodiments the longitudinal distance B" is between about one inch and four inches. In other embodiments the longitudinal distance B" is between about two inches and three inches.

In other embodiments the longitudinal positions for the handlebar location includes an intermediate handlebar position 144 about the longitudinal distance C" longitudinally rearward of a vehicle center of gravity location CG, as shown in FIG. 5(*b*). In some embodiments the longitudinal distance C" is between about six inches and nine inches. In other embodiments, the longitudinal distance C" is between about seven inches and eight inches. Other embodiments include a handlebar location that includes an intermediate handlebar position 144 about the longitudinal distance A" longitudinally forward of a front end of the seat 36, the longitudinal distance B" longitudinally rearward of a front end of the footrests 50, and/or about the longitudinal distance C" longitudinally rearward of a vehicle center of gravity location.

In other embodiments the longitudinal positions for the handlebar location includes a forward handlebar position 142 as shown in FIGS. 6(*a*) and (*b*). For example, the forward handlebar location 142 may be at least about the longitudinal distance A''' longitudinally forward of a front end 1036 of the seat 36, as shown in FIG. 6(*b*). In some embodiments, the longitudinal distance A''' is at least about eight inches. In other embodiments, the longitudinal distance A''' is at least about ten inches. In yet other embodiments, the longitudinal distance A" is at least about fourteen inches.

In other embodiments the longitudinal positions for the handlebar location includes a forward handlebar position 142 at least about the longitudinal distance B''' longitudinally forward of a front end 1050 of the footrests 50, as shown in FIG. 6(*b*). In some embodiments the longitudinal distance B''' is at least about one-half inch. In other embodiments the longitudinal distance B''' is at least about two inches. In yet other embodiments the longitudinal distance B''' is at least about three inches.

In other embodiments the longitudinal positions for the handlebar location includes a forward handlebar position 142 less than about the longitudinal distance C''' longitudinally rearward of a vehicle center of gravity location CG, as shown in FIG. 6(*b*). In some embodiments the longitudinal distance C''' is less than about six inches. In other embodiments, the longitudinal distance C''' is less than about two inches. In yet other embodiments, the forward handlebar position 142 is forward of the vehicle center of gravity location CG. Again, the same embodiment may include a handlebar location that includes a forward handlebar position 142 at least about the longitudinal distance A''' longitudinally forward of a front end of the seat 36, at least about the longitudinal distance B''' longitudinally forward of a front end of the footrests 50, and/or less than about the longitudinal distance C''' rearward of a vehicle center of gravity location CG.

In some embodiments, the seat may be raised, such as, for example, by about four to six inches as compared to traditional seat heights, to assist the rider 40 in transferring from a sitting position on the seat 36 to a standing position. In such embodiments, the rider may be positioned on the seat at a vertical height above the rider's knees to facilitate standing.

Some embodiments of the invention allow for combinations of the handlebar locations discussed above. In some embodiments the handlebar adjustment apparatus 138 allows for at least three rider positions, the angular positions of the steering post 58 providing longitudinal positions for the handlebar location including at least longitudinally intermediate and rearward handlebar positions. Other embodiments include angular positions of the steering post 58 further providing longitudinal positions for the handlebar location including at least longitudinally forward and rearward handlebar positions. Further, some embodiments include angular positions of the steering post 58 further providing longitudinal positions for the handlebar location including at least longitudinally forward and intermediate handlebar positions. Some embodiments of the invention allow for more than three handlebar positions. For example, some embodiments of the present invention allow for more than seven handlebar positions.

Figure 12:
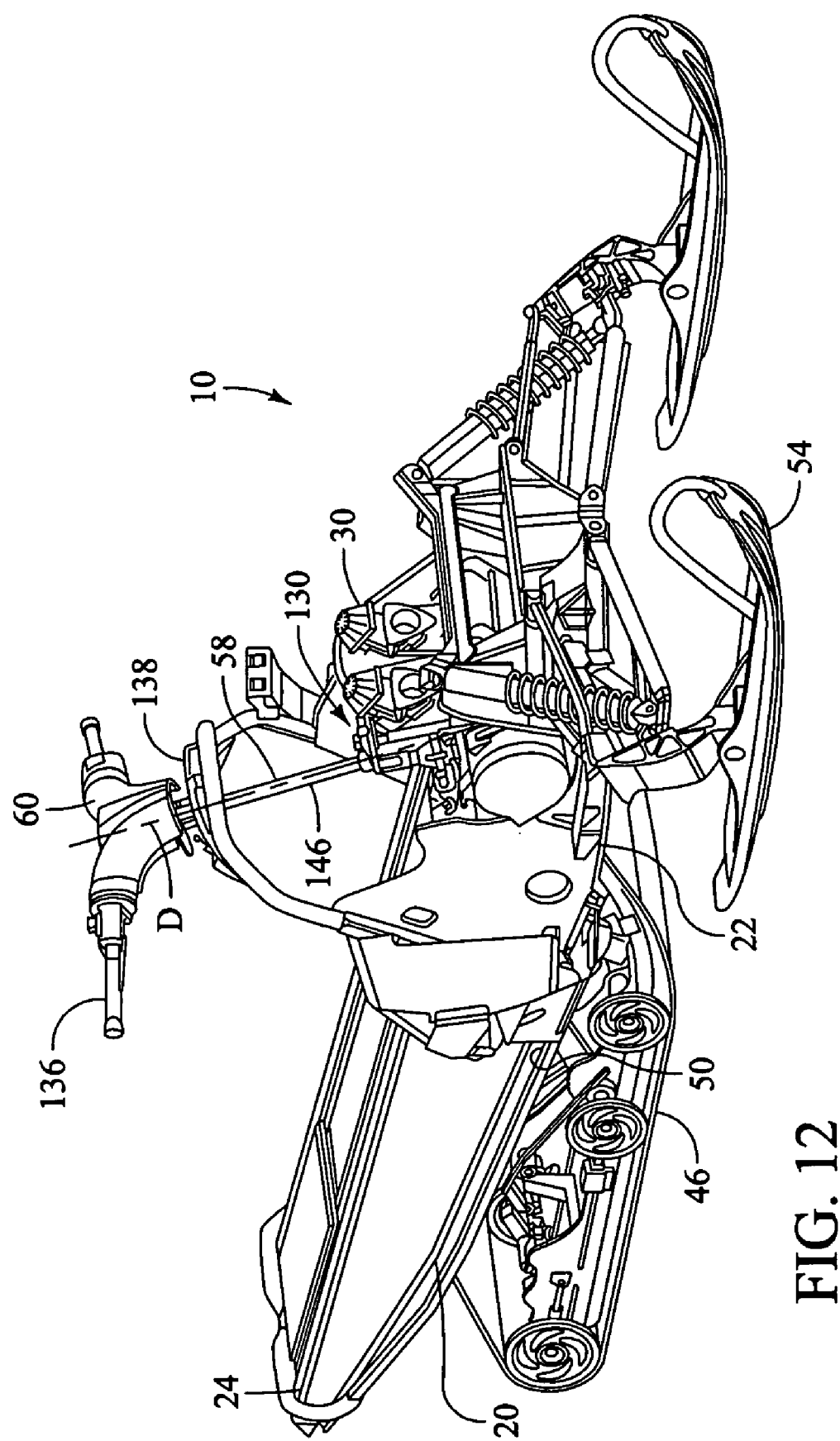
FIG. 12 shows a perspective view of a snowmobile chassis, steering assembly and engine in accordance with an embodiment of the present invention.

As discussed above, a handlebar adjustment apparatus 138 may be connected to the chassis 20 to fix the pivot of the steering post 58 in angular positions about the pivot mechanism 130. In some embodiments, the steering post 58 includes a top post 146 and a bottom post 148 connected by the pivot mechanism 130, as shown for instance in FIGS. 10-12. It is understood, however, that the bottom post 148 could be eliminated if the bottom of the pivot mechanism 130 is connected directly to the steering mechanism 132 or if the steering mechanism 132 is connected above the pivot mechanism 130. In the embodiments shown, for instance, in FIGS. 10-12, the pivot mechanism 130 permits pivot of the top post 146 relative to the bottom post 148. The bottom post 148 can be mounted to the chassis 20 behind the engine 30 and be connected to the skis 54. As shown in FIG. 12, the top post 146 may define a central axis D, the projection of which, in some embodiments, intersects the engine 30. Accordingly, if the top post 146 continued downward along its central axis D, the engine 30 would block the top post 146. The central axis D may be non-parallel to the longitudinal centerline E of the vehicle when viewed from the top of the chassis or the vehicle. For instance, as shown in FIG. 8(b), the central axis D is angled at least 3-4 degrees from the longitudinal centerline when viewed from the top of the chassis or the vehicle. In other embodiment, the angle could be 10 degrees or more. In such embodiments, the handlebars 60 are mounted at an angle to the steering post 58.

Figure 13:
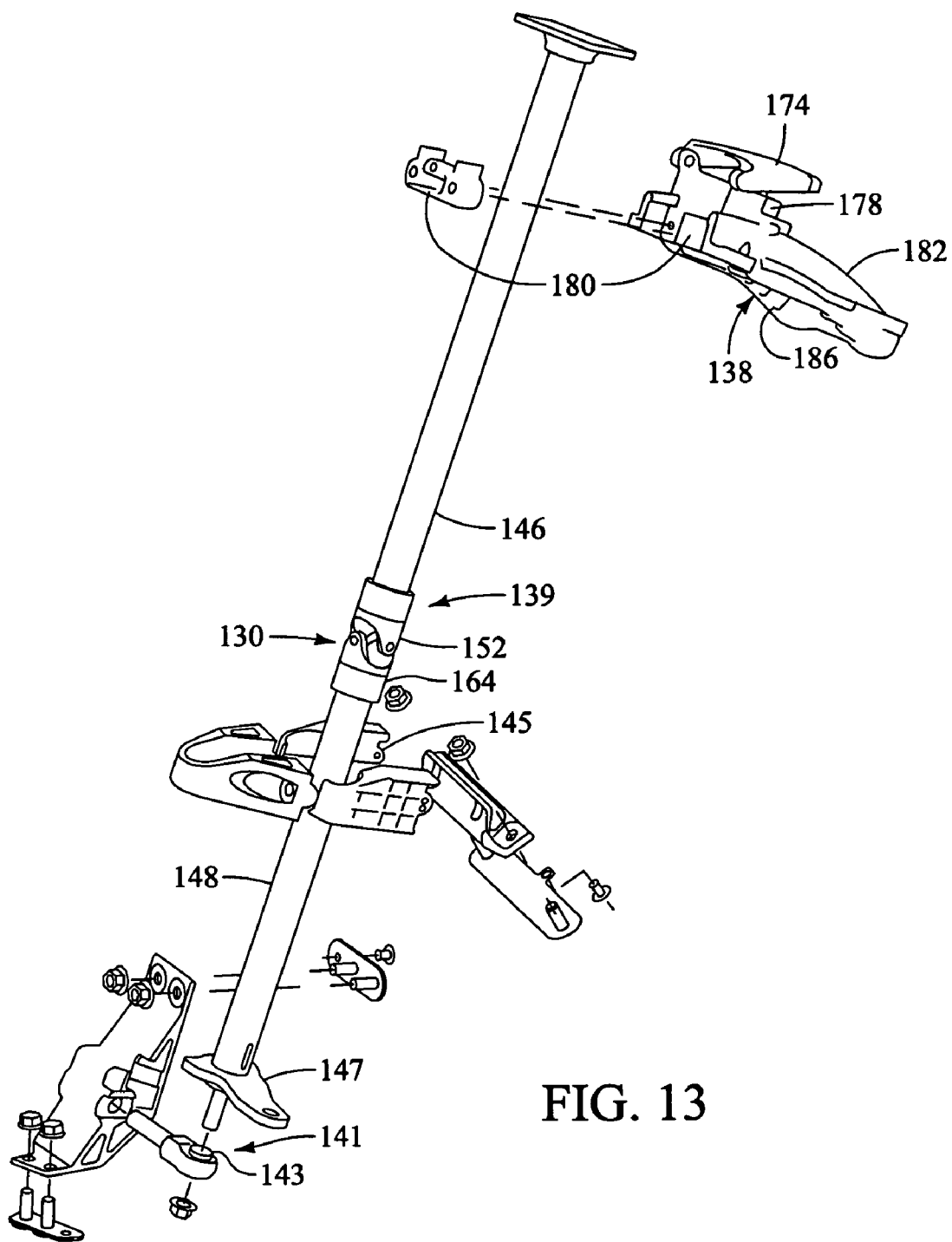
FIG. 13 shows an exploded perspective view of a steering adjustment apparatus in accordance with an embodiment of the present invention.

Some embodiments of the adjustable steering mechanism 138 include a first pivot mechanism 139 at a first axial location along the steering post defining a first steering post axis D, and a second pivot mechanism 141, wherein the portion of the steering post between the first pivot mechanism and the second pivot mechanism defining a second or bottom steering post axis L. Similar to the top steering post axis D, the central axis L of the bottom steering post may be non-parallel to the longitudinal centerline E of the vehicle when viewed from the top of the chassis or the vehicle (see FIG. 8(b)). In some embodiments, at least one of the central axes D and L are non-parallel to the longitudinal centerline E when viewed from the top of the vehicle. In some embodiments, the second pivot mechanism comprises a ball joint 143, as shown in FIG. 13. Such an embodiment may also include a mount 145 supporting the steering post at an axial location above the second pivot mechanism and below the first pivot mechanism, as shown in FIG. 13. The mount 145 may comprise a substantially maintenance free bushing, such as a bushing that does not require periodic lubrication. Further, a frog 147 useful for connecting the steering post to the steering mechanism 132 may be located at an axial position above the second pivot mechanism 141, also as shown in FIG. 13. Of course, the frog 147 could be located at other axial positions relative to the second pivot mechanism 132, including axially below the second pivot mechanism or on the upper steering post.

Figure 14:
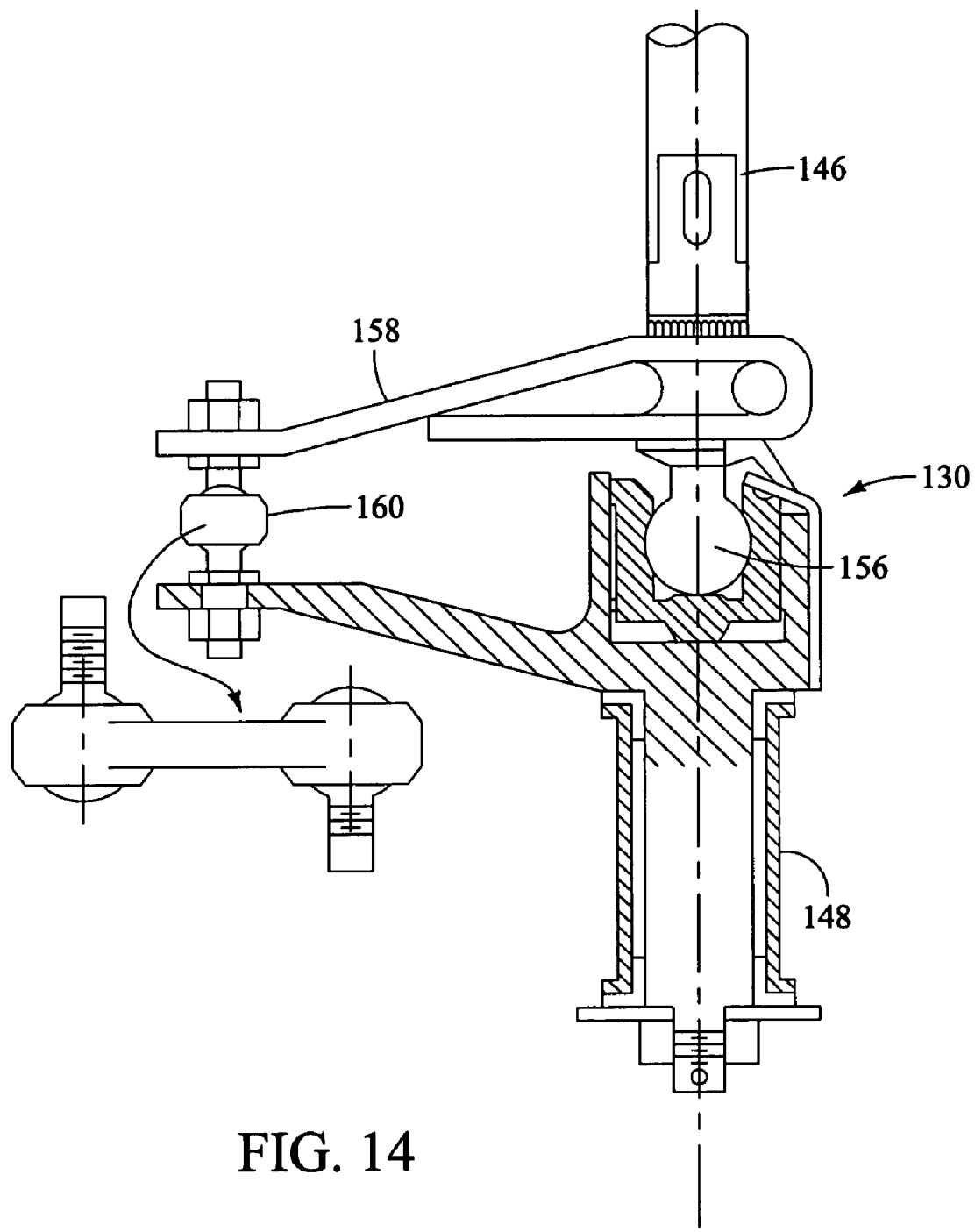
FIG. 14 shows a side plan view of a joint in accordance with an embodiment of the present invention.

Pivot mechanism 130 may comprise any feature or characteristic that provides for pivoting of post 58. For example, pivot mechanism 130 may comprise a flexible material that allows post 58 to pivot. In such embodiments, the flexible material may be capable of translating rotational force. In some embodiments, the steering post 58 may have a top post 146 and a bottom post 148 connected by a joint 152. The top steering post 146 should be as long as possible when it is desired to minimize angular rotation of the handlebars 60 while the post 58 is pivoted about the pivot mechanism 130. Alternatively, pivoting a shorter top steering post 146 would cause significant angular rotation of the handlebars about a generally horizontal, transverse axis. The joint 152 permits the pivot of the top post 146 relative to the bottom post 148. In these embodiments, pivot mechanism 130 includes joint 152. In some embodiments, joint 152 includes a universal joint 164, as shown in FIG. 13, that pivots about a single axis yet transfers rotational motion (i.e., steering motion) between the top and bottom steering posts. In other embodiments, joint 152 may include a ball joint 156, as shown in FIG. 14. Such embodiments may further include a steering support assembly 158 operatively coupled to the top steering post 146 and the bottom steering post 148. The steering support assembly 158 may include a second ball joint 160. In such embodiments, the ball joint 156 and second ball joint 160 allow for the top post 146 to pivot relative to the bottom post 148, while being capable of translating rotational force through the posts 146, 156 to effect steering.

In some embodiments, steering post 58 may include several sections and/or pivot mechanisms 130. For example, steering post 58 may include top post 146, bottom post 148, and an intermediate post (not shown) located between top post 146 and bottom post 148. Such an embodiment may include pivot mechanisms 130 located, for example, below bottom post 148, between bottom post 148 and the intermediate post, and between the intermediate post and the top post 146. In other embodiments, steering post 58 may include top post 146, bottom post 148, and pivot mechanisms 130 located below bottom post 148, and between top post 146 and bottom post 148.

The handlebar adjustment apparatus 138 may include any apparatus or device capable of providing adjustment to the handlebars 60, and may provide infinite adjustment along the adjustment range or along discrete intervals. For example, the handlebar adjustment apparatus 138 is shown in FIGS. 4-7, 10-13, and 16-18. The handlebar adjustment apparatus 138 may include means for locking, such as a lock 170 (e.g., a spring-biased wedge and a plurality of detents), a means for releasing the means for locking, such as a release actuator 174, and a steering post retainer 178 (see FIG. 13). In some embodiments, release actuator 174 may be useful for actuating the handlebar adjustment apparatus 138 without tools.

Such embodiments may include a release actuator useful for being actuated manually by applying a downward force, or a hydraulic, electric, or pneumatic system actuated by a switch (not shown). In some embodiments, one or more components of the adjustment apparatus 138 comprise a mostly non-metallic material, such as a plastic or a composite.

The steering post retainer 178 may be any apparatus or device capable of supporting at least a portion of the post 58 while allowing the post to rotate. For example, the steering post retainer may include a bushing or a bearing (e.g., a split sleeve rotational bearing 180 as shown in FIG. 13) that journals the post 58. The steering post retainer may comprise a substantially maintenance free bushing, such as a bushing that does not require periodic lubrication. Adjustment of the steering post retainer 178 a long the track 182 may adjust the angle of the steering post 58. The steering post retainer 178 may move with the pivot of the steering post 58 and may or may not move with the rotation of the steering post 58.

The chassis 20 may restrict movement of the steering post retainer 178 to movement along a track 182 functionally formed on (e.g., fixedly mounted to) the chassis 20. Such an embodiment provides for stabilization against the strong forces commonly experienced by a steering post in a straddle seat type vehicle. The guide track may functionally support the steering post in the longitudinal and transverse directions. In some embodiments, the guide track supports the steering post retainer in the transverse direction at a first axial location along the steering post, and the pivot allows the steering post to pivot about a second axial location along the steering post. The frame track 182 may be curved at a radius similar to or generally matching the distance between the pivot mechanism 130 and the steering post retainer 178. For example, such a radius may be between about 12 inches and 30 inches. In other embodiments, the track may be straight and allow for the post 58 to translate axially within its retainer through the pivot motion. In other embodiments, the steering post is substantially axially fixed relative to the steering post retainer during adjustment. Further, the steering post retainer 178 may slidably engage the track 182 along a recess formed on the retainer 178. In some embodiments the steering post retainer 178 remains generally coaxially aligned with the steering post 58 during movement of the steering post retainer 178 along the frame track 182 to prevent binding of the steering post 58 relative to the steering post retainer 178.

Figure 16:
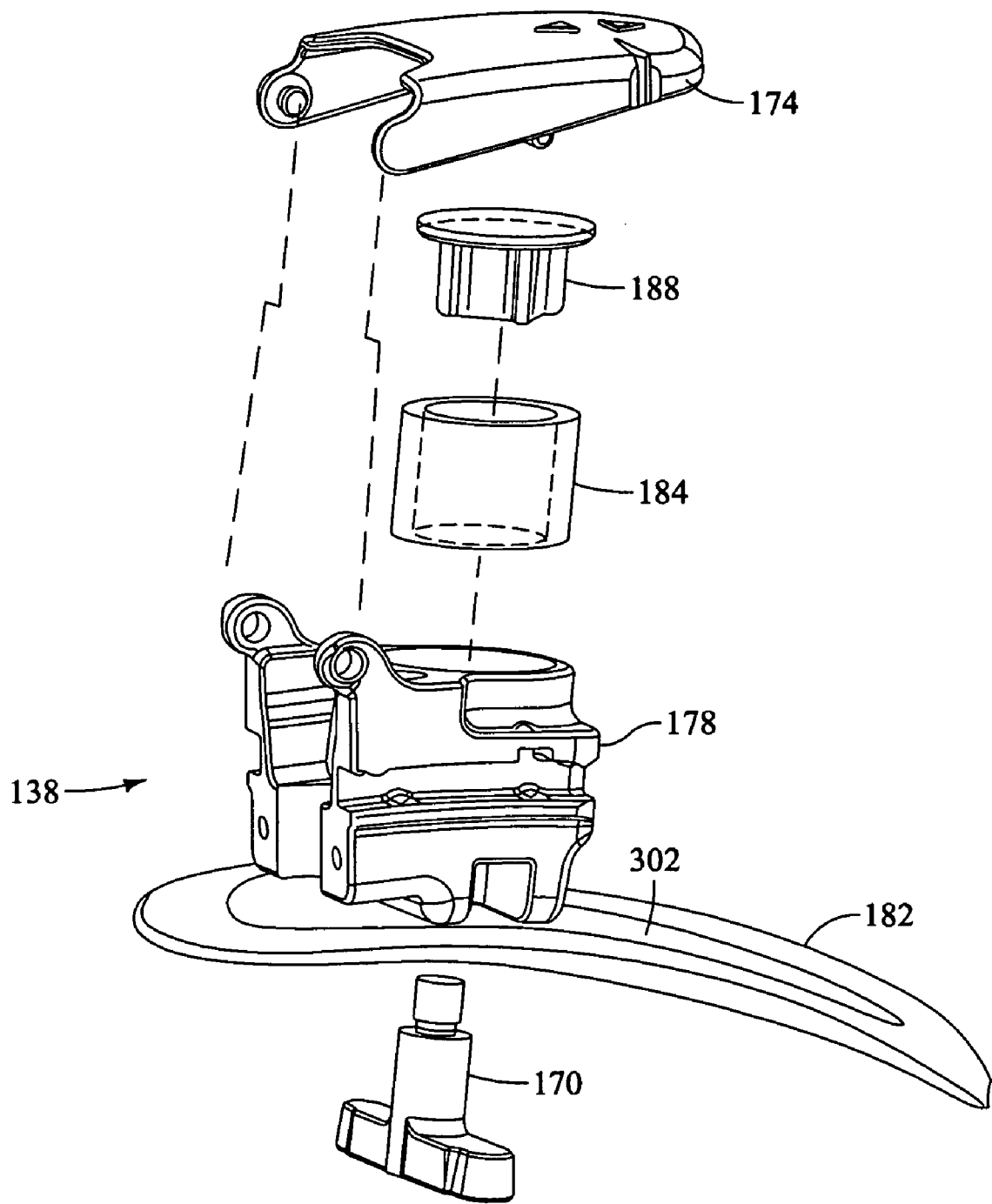
FIG. 16 shows an exploded perspective view of an adjustable steering apparatus in accordance with an embodiment of the present invention.
Figure 17:
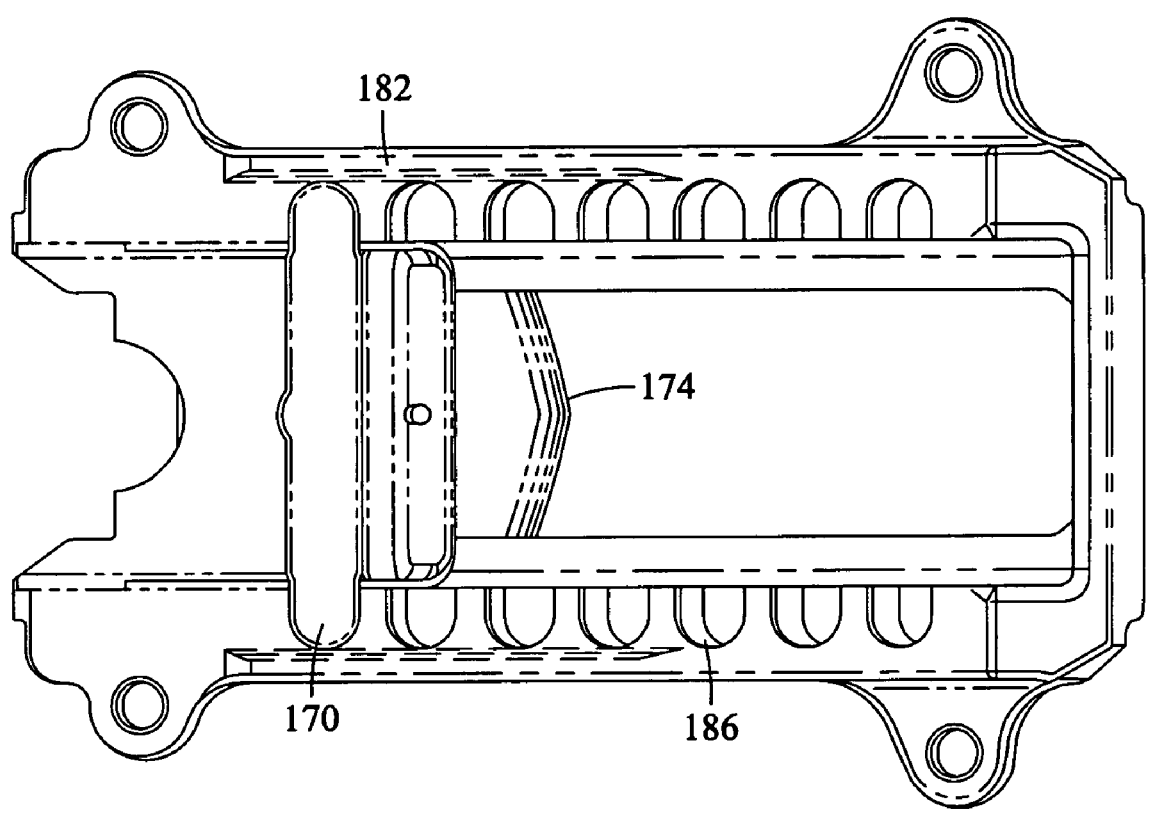
FIG. 17 shows a bottom plan view of an adjustable steering apparatus in accordance with an embodiment of the present invention.

With particular reference to FIGS. 16 and 17, the lock 170 may fix the steering post retainer 178 in position along the track 182, and the release actuator 174 may release the lock 170 to permit adjustment of the steering post retainer 178 along the chassis track 182. The lock 170 may comprise a wedge and be biased, such as by spring 184, to fix the steering post retainer 178 in position along the track 182. In some embodiments, the lock 170 engages at least one detent 186, which may be attached to or formed integrally with the track 182. Further, some embodiments are provided with a plunger 188 that is useful for retaining a portion of the lock 170 and for transferring force from the release actuator 174 to compress the spring 184. In such embodiments, the rider 40 would manually depress the release actuator 174, thereby transferring compressive force through the plunger 188 to compress the spring 184 and disengage lock 170 from at least one detent 186 carried on track 182. Post 58 would thereby be free to pivot as the steering post retainer 178 is slid along track 182. When the rider 40 locates a desired position of the handlebars 60, the release actuator 174 is released and lock 170 engages another detent 186 under the force of the spring 184. In some embodiments, the release actuator 174 is located towards a seating position on the vehicle to facilitate easy access by the rider 40.

The snowmobile 10 may be provided with a handlebar adjustment apparatus 138 that allows the handlebars 60 to be adjusted along specific or predefined distances, paths or angles. For example, the handlebars 60 may be pivotally adjustable fore and aft about the steering post pivot mechanism 130 along an arc with a radius approximately equal to the distance between the pivot mechanism 130 and the handlebars. In some embodiments this radius is at least about 30 inches. Increasing the radius minimizes rotational adjustment of the handlebars 60 for a given longitudinal adjustment. In some embodiments, the arc radius is at least equal to the longitudinal extent of adjustability. In such embodiments, for example, if the handlebars are longitudinally adjustable twelve inches fore and aft, the radius is at least twelve inches. Further, the handlebar adjustment apparatus 138 may fix the pivot of the steering post 58 in angular positions about the pivot mechanism 130 in a range of about 0 to 45 degrees from vertical, as shown in FIG. 10. In such embodiments where the range is limited to about 0 to 45 degrees from vertical, adjustment moves the handlebars 60 more longitudinally than vertically.

Figure 18:
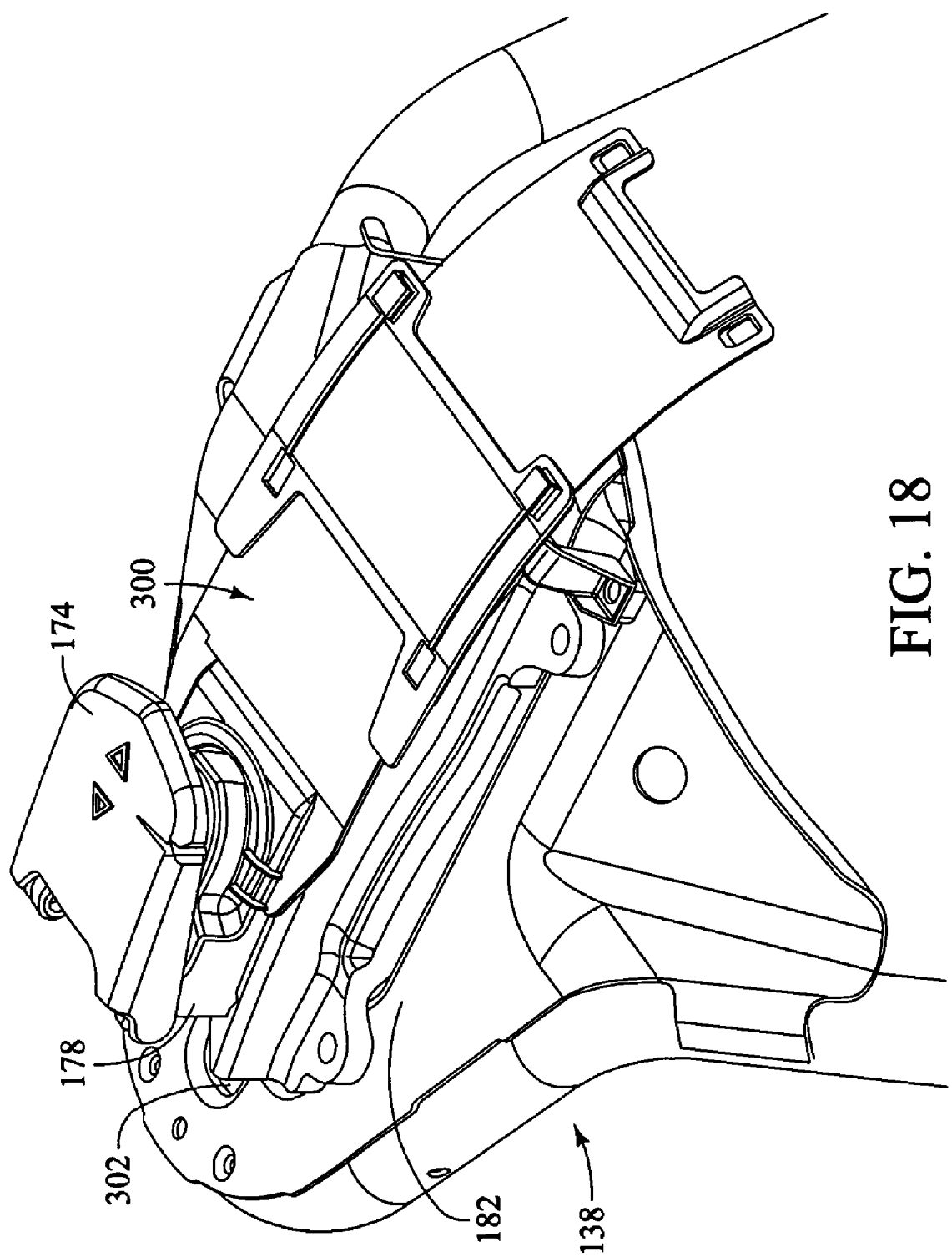
FIG. 18 shows a perspective view of an adjustable steering apparatus with a cover in accordance with an embodiment of the present invention.
Figure 19:
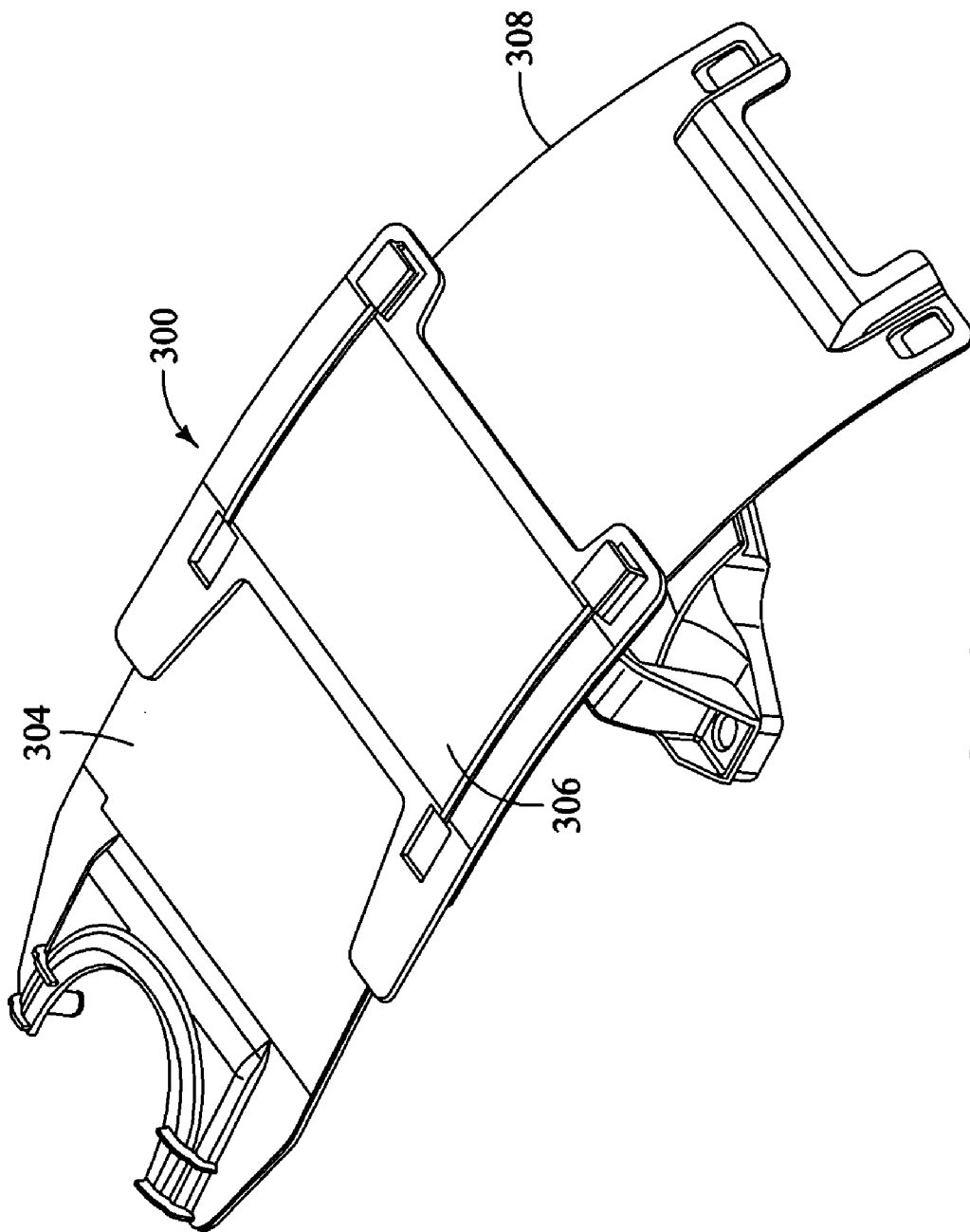
FIG. 19 shows a perspective view of a cover in accordance with an embodiment of the present invention.

In some embodiments, the adjustable steering mechanism 138 includes a cover 300, as shown in FIGS. 18 and 19. The cover 300 is useful for covering a slot 302 defined by the guide track. The cover 300 is useful for substantially covering the slot 302 regardless of the steering post location. In some embodiments, the cover 300 is coupled to the steering post retainer, and the cover 300 may comprise one or more pieces. In the embodiment shown in FIG. 19, the cover comprises a first piece 304 (which may be coupled to the retainer 178), a second piece 306, and a third piece 308. Of course, the cover 300 may comprise any suitable number of pieces. The pieces may be slidingly connected to cover the slot 302 as the steering post is adjusted.

The handlebar location may be adjustable longitudinally and/or vertically as much as desired. The handlebar location may be adjustable about a range of at least about two inches to more than about twelve inches in the longitudinal direction. Further, the handlebar position may be adjustable about a range of at least about one inch to more than about six inches in the vertical direction. In some embodiments, the handlebars 60 may be pivotally adjustable fore and aft by more than about six inches. For example, the handlebars 60 may be pivotally adjustable for and aft by more than about twelve inches. Further, the handlebars 60 may be configured to move at least one inch vertically as they are pivotally adjusted fore and aft.

Some embodiments of the present invention include a means for adjusting the steering post 58 telescopingly to adjust the axial length of the steering post 58. In the embodiment shown in FIGS. 15(a)-(c), a releasable telescope lock 200 is included that locks axial adjustment of the steering post 58. In such embodiments, one end of the steering post connects to the skis through the steering mechanism 132. The other end of the steering post is connected to the steering control (e.g., handlebars 60). A release actuator 204 positioned proximate the steering control that releases the telescope lock 200 may be provided to permit axial adjustment of the length of steering post 58. In some embodiments, telescope lock 200 includes a ramp portion 206 and at least one ball 208. The inner portion of post 58 may include at least one groove 210 useful for receiving at least one ball 208 and may be formed with splined portions 212 to permit relative axial adjustment between the portions and to restrict relative rotational movement between the portions. Further the outer portion of post 58 may have at least one eyelet 214 useful for allowing the ball 208 to contact groove 210. A spring 216 may be provided to bias the actuator 204 in a locked position.

In such an embodiment, the rider 40 may pull actuator 204, thereby moving ramp portion 206 relative to post 58. As ramp portion 206 is moved, compressive force on at least one ball 208 is reduced, until at least one ball 208 is displaced from the groove 210 and eyelet 214. Post 58 may then be telescopingly adjusted until the rider 40 releases actuator 204 and the ramp portion 206 engages ball 208 and groove 210 under force of spring 216. Of course, such a telescoping feature may be combined with any embodiment of the handlebar adjustment apparatus 138 discussed above. Moreover, other telescoping designs and telescope locks known in the art may be used to permit the axial adjustment of the steering post.

Some embodiments of the invention include a method of adjusting a steering control position. In some embodiments, the method comprises providing a vehicle with any of the adjustable steering mechanisms described above, adjusting the position of the steering control longitudinally to a relatively rearward position without tools, and adjusting the position of the steering control longitudinally to a relatively forward position without tools. Some embodiments of the method also include the step of telescopingly adjusting the position of the steering control axially to a relatively lower or higher position.

Thus, embodiments of the various vehicles with adjustable steering apparatuses are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A vehicle comprising:
   a chassis, an engine supported by the chassis, the engine coupled to a drivetrain useful for propelling the vehicle, a straddle type seat supported by the chassis, and at least one travel surface-engaging element for steering the vehicle;
   a steering post operatively connected to the at least one travel surface-engaging element, the steering post having a pivot mechanism, the pivot mechanism permitting the portion of the steering post above the pivot mechanism to pivot longitudinally fore and aft;
   a steering control supported by the steering post, the steering control useful for rotating the steering post to effect steering of the vehicle;
   an adjustable steering mechanism movably coupling the steering post to the chassis, the adjustable steering mechanism including a means for locking the steering post to the chassis, a means for releasing the means for locking, a steering post retainer operatively connected to the steering post, and a guide track functionally formed on the chassis, the adjustable steering mechanism selectively permitting movement of the steering post retainer along the guide track to move the steering control longitudinally fore and aft.

2. The vehicle of claim 1, wherein the guide track functionally supports the steering post in the longitudinal and transverse directions.

3. The vehicle of claim 1, wherein the guide track supports the steering post retainer in the transverse direction at a first axial location along the steering post, and the pivot allows the steering post to pivot about a second axial location along the steering post.

4. The vehicle of claim 1, wherein the vehicle is a snowmobile.

5. The vehicle of claim 1, wherein the vehicle is an all-terrain vehicle.

6. The vehicle of claim 1, wherein the vehicle is a personal watercraft.

7. The vehicle of claim 1, wherein the adjustable steering mechanism further includes a mount, the steering post retainer and mount comprising substantially maintenance free bushings.

8. The vehicle of claim 1, wherein the pivot mechanism permits the portion of the steering post above the pivot mechanism to pivot in a range of about 0 to 45 degrees from vertical.

9. The vehicle of claim 1, wherein the means for releasing the means for locking allows the steering post to move freely fore and aft relative to the chassis.

10. The vehicle of claim 1, wherein the means for locking has a lock position wherein the position of the steering post relative to the chassis is fixed, and an unlock position wherein the position of the steering post relative to the chassis is variable.

11. A vehicle comprising:
    a chassis defining a longitudinal centerline, an engine supported by the chassis, the engine coupled to a drivetrain useful for propelling the vehicle, a straddle type seat supported by the chassis, and at least one travel surface-engaging element for steering the vehicle;
    a steering post operatively connected to the at least one travel surface-engaging element;
    a steering control supported by the steering post, the steering control useful for rotating the steering post to effect steering of the vehicle; and
    an adjustable steering mechanism movably coupling the steering post to the chassis to permit movement of the steering control longitudinally fore and aft, the adjustable steering mechanism including a pivot mechanism at an axial location along the steering post, the portion of the steering post above the pivot mechanism defining a top steering post axis, the portion of the steering post below the pivot mechanism defining a bottom steering post axis, at least one of the top steering post axis and the bottom steering post axis being non-parallel to the longitudinal centerline of the chassis when viewed from the top of the vehicle in all steering configurations.

12. The vehicle of claim 11, wherein the pivot mechanism comprises a universal joint.

13. The vehicle of claim 11, wherein the pivot mechanism comprises a first ball joint that connects a top steering post and a bottom steering post together to form the steering post, the adjustable steering mechanism further including a steering support assembly operatively coupled to the top steering post and the bottom steering post, and the steering support assembly including a second ball joint.

14. The vehicle of claim 11, wherein the top steering post is non-parallel to the longitudinal centerline of the chassis when viewed from the top of the vehicle.

15. The vehicle of claim 11, further including a bearing journaling the steering post at an axial location below the pivot mechanism.

16. The vehicle of claim 11, wherein the adjustable steering mechanism further includes a lock, a release actuator, a steering post retainer operatively connected to the steering post, and a guide track functionally formed on the chassis, the adjustable steering mechanism selectively permitting movement of the steering post retainer along the guide track to move the steering control longitudinally fore and aft.

17. The vehicle of claim 11, further including a second pivot mechanism connected to the steering post at an axial location below the pivot mechanism, the second pivot mechanism permitting adjustment of the angle of the bottom steering post axis.

18. The vehicle of claim 17, further including a frog useful for functionally coupling the steering post to the travel surface engaging element, the frog located axially between the pivot mechanism and the second pivot mechanism.

19. A snowmobile with adjustable steering, comprising:
a chassis, the chassis supporting an engine, the engine powering an endless drive track operatively connected to the chassis, a straddle type seat supported by the chassis, and at least one ski operatively coupled to the chassis;
a steering post operatively connected to the at least one ski, the steering post having a pivot mechanism, the pivot mechanism permitting the portion of the steering post above the pivot mechanism to pivot longitudinally fore and aft;
handlebars supported by the steering post for rotating the steering post to effect steering, the handlebars moving longitudinally with the pivot mechanism of the steering post, the handlebars being pivotally adjustable fore and aft about the steering post pivot mechanism along an arc with a radius of at least equal to the extent of adjustability of the steering post; and
a handlebar adjustment apparatus connected to the chassis and fixing the pivot of the steering post in angular positions about the pivot mechanism in a range of about 0 to 45 degrees from vertical, whereby adjustment moves the handlebars more longitudinally than vertically.

20. The snowmobile of claim 19, wherein the handlebar adjustment apparatus includes a lock, a release actuator, and a steering post retainer, the steering post retainer moving with the pivot of the steering post, the chassis restricting movement of the steering post retainer to movement along a track defined in the chassis, the lock fixing the steering post retainer in position along the track, and the release actuator releasing the lock to permit adjustment of the steering post retainer along the chassis track, whereby adjustment of the steering post retainer along the track adjusts the angle of the steering post.

21. The snowmobile of claim 20, wherein the track defined in the chassis is curved at a radius similar to the distance between the pivot mechanism and the steering post retainer.

22. The snowmobile of claim 20, wherein the steering post retainer remains generally coaxially aligned with the steering post during movement of the steering post retainer along the chassis track to prevent binding of the steering post relative to the steering post retainer.

23. The snowmobile of claim 20, wherein the steering post is substantially axially fixed relative to the steering post retainer during adjustment.

24. The snowmobile of claim 19, further comprising a lock having a locked position wherein the position of the steering post relative to the chassis is fixed, and an unlocked position wherein the position of the steering post relative to the chassis is variable.

25. A snowmobile with adjustable steering, comprising:
a chassis, the chassis supporting an engine, the engine powering an endless drive track operatively connected to the chassis, a straddle type seat supported by the chassis, and at least one ski operatively coupled to the chassis;
a steering post operatively connected to the at least one ski, the steering post having a top post and a bottom post connected by a joint, the joint permitting pivoting of the top post relative to the bottom post, the bottom post mounted to the chassis;
handlebars supported by the steering post for rotating the steering post to effect steering, the handlebars moving longitudinally with the pivoting of the top post; and
a handlebar adjustment apparatus connected to the chassis and fixing the pivot of the top post in angular positions about the joint.

26. The snowmobile of claim 25, wherein the handlebar adjustment apparatus includes a lock, a release actuator, and a steering post retainer, the steering post retainer moving with the pivot of the steering post, the chassis restricting movement of the steering post retainer to movement along a track formed on the chassis, the lock fixing the steering post retainer in position along the track, and the release actuator releasing the lock to permit adjustment of the steering post retainer along the chassis track, whereby adjustment of the steering post retainer along the track adjusts the angle of the steering post.

27. The snowmobile of claim 25, further comprising a lock having a locked position wherein the position of the steering post relative to the chassis is fixed, and an unlocked position wherein the position of the steering post relative to the chassis is variable.

28. A snowmobile with adjustable steering, comprising:
a chassis, the chassis supporting an engine, the engine powering an endless drive track operatively connected to the chassis, a straddle type seat supported by the chassis, and at least one ski operatively coupled to the chassis;
a steering post operatively connected to the at least one ski, the steering post having a pivot mechanism, the pivot mechanism permitting a portion of the steering post above the pivot mechanism to pivot longitudinally fore and aft;
handlebars supported by the steering post for rotating the steering post to effect steering, the handlebars moving longitudinally with the pivot mechanism of the steering post;
hand grips mounted on opposite sides of the handlebars adapted to be gripped by the hands of the rider, a handlebar location defined as the centerpoint between the hand grips when the handlebars are orientated to steer the snowmobile in a substantially straight direction, the handlebar location being pivotally adjustable fore and aft by at least four inches; and
an adjuster configured to fix the portion of the steering post above the pivot in angular positions about the pivot mechanism.

29. The snowmobile of claim 28, wherein the handlebar location is pivotally adjustable fore and aft by at least five inches.

30. The snowmobile of claim 28, wherein the handlebar location is pivotally adjustable fore and aft by at least six inches.

31. The snowmobile of claim 28, wherein the handlebar location moves at least one inch vertically as it is pivotally adjusted fore and aft.

32. The snowmobile of claim 28, further comprising a lock having a locked position wherein the position of the steering post relative to the chassis is fixed, and an unlocked position wherein the position of the steering post relative to the chassis is variable.

33. An adjustable steering mechanism adapted for use with a vehicle comprising:
a steering post;

a steering control supported by the steering post, the steering control useful for rotating the steering post to effect steering of the vehicle;

an adjustable coupler movably coupling the steering post to a chassis of the vehicle, the adjustable coupler including a lock that locks the steering post to a chassis of the vehicle, a release for the lock, a steering post retainer operatively connected to the steering post, and a guide track functionally formed on the chassis, the adjustable coupler selectively permitting movement of the steering post retainer along the guide track to move the steering control longitudinally fore and aft.

34. The adjustable steering mechanism of claim 33, wherein the guide track functionally supports the steering post in the longitudinal and transverse directions.

35. The adjustable steering mechanism of claim 33, wherein the steering post includes a pivot.

36. The adjustable steering mechanism of claim 35, wherein the guide track supports the steering post retainer in the transverse direction at a first axial location along the steering post, and the pivot allows the steering post to pivot about a second axial location along the steering post.

37. The adjustable steering mechanism of claim 33, wherein the steering control includes a handlebar.

38. The adjustable steering mechanism of claim 33, wherein the lock includes a spring-biased wedge and a plurality of detents.

39. The adjustable steering mechanism of claim 33, wherein the release includes a lever.

40. The adjustable steering mechanism of claim 33, wherein the release provides for tool-less adjustment of the steering control location.

41. The adjustable steering mechanism of claim 33, wherein the adjustable coupler comprises a generally non-metallic material.

42. The adjustable steering mechanism of claim 33, wherein the release is located towards a seating position on the vehicle.

43. The adjustable steering mechanism of claim 33, wherein the adjustable coupler provides adjustment on an arc having a radius at least equal to the length of adjustability of the steering post.

44. The adjustable steering mechanism of claim 33, wherein the adjustable coupler provides adjustment between zero and 45 degrees from vertical.

45. The adjustable steering mechanism of claim 33, wherein the steering post is generally axially fixed relative to the steering post retainer during adjustment.

46. The adjustable steering mechanism of claim 33, wherein the guide track defines a slot, the adjustable steering mechanism further including a cover that substantially covers the slot regardless of the steering post location.

47. The adjustable steering mechanism of claim 33, further including a telescopic adjustment mechanism.

48. The steering mechanism of claim 33, wherein the release allows the steering post to move freely fore and aft relative to the chassis.

49. The steering mechanism of claim 33, wherein the lock has a locked position wherein the position of the steering post relative to the chassis is fixed, and an unlock position wherein the position of the steering post relative to the chassis is variable.

50. A method of adjusting a steering control position, comprising:

providing a vehicle with an adjustable steering mechanism including a steering post, a steering control supported by the steering post, a lock, a means for releasing the lock, a steering post retainer, and a guide track functionally formed on a chassis of the vehicle;

adjusting the position of the steering control longitudinally to a relatively rearward position without tools; and adjusting the position of the steering control longitudinally to a relatively forward position without tools.

51. The method of adjusting a steering control position of claim 50, further including the step of telescopingly adjusting the position of the steering control axially to a relatively higher position.

52. The method of adjusting a steering control position of claim 50, further including the step of telescopingly adjusting the position of the steering control axially to a relatively lower position.

* * * * *